United States Patent
Makita et al.

(10) Patent No.: US 7,008,007 B2
(45) Date of Patent: *Mar. 7, 2006

(54) VEHICLE BODY END STRUCTURE

(75) Inventors: Masashi Makita, Fujisawa (JP); Chinmoy Pal, Yokosuka (JP)

(73) Assignee: Nissan Motors Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/898,941

(22) Filed: Jul. 27, 2004

(65) Prior Publication Data

US 2005/0067860 A1  Mar. 31, 2005

(30) Foreign Application Priority Data

| Sep. 25, 2003 | (JP) | ............................. 2003-333641 |
| Nov. 13, 2003 | (JP) | ......................... P 2003-383707 |
| May 19, 2004 | (JP) | ......................... P 2004-149428 |

(51) Int. Cl.
   *B62D 25/08* (2006.01)

(52) U.S. Cl. ............ 296/187.09; 296/205; 296/203.02; 280/784

(58) Field of Classification Search ........... 296/187.01, 296/187.09, 193.01, 205, 204, 203.02, 29; 180/311; 280/781

See application file for complete search history.

(56) References Cited

U.S. PATENT DOCUMENTS

| 2,856,226 A | 10/1958 | Purdy |
| 3,171,669 A | 3/1965 | Barenyl |
| 3,520,552 A | 7/1970 | Graham et al. |
| 3,638,748 A | 2/1972 | Tixier |
| 4,057,263 A | 11/1977 | Schwuchow et al. |
| 5,100,189 A * | 3/1992 | Futamata et al. ........... 293/132 |
| 5,862,877 A | 1/1999 | Horton et al. |
| 6,811,211 B1 | 11/2004 | Saito |
| 2004/0100127 A1 | 5/2004 | Saitou |
| 2004/0195862 A1 | 10/2004 | Saeki |
| 2004/0200659 A1 | 10/2004 | Miyasaki |

FOREIGN PATENT DOCUMENTS

| JP | 03079477 A | * 4/1991 |
| JP | 04050083 A | * 2/1992 |
| JP | 04310477 A | * 11/1992 |

(Continued)

OTHER PUBLICATIONS

U.S. Appl. No. 10/766,025, filed Jan. 29, 2004, Makita et al.

*Primary Examiner*—Patricia L. Engle
(74) *Attorney, Agent, or Firm*—Shinjyu Global IP Counselors, LLP

(57) ABSTRACT

A vehicle body end structure has a longitudinal frame member connected to a transverse frame member by curved parts to disperse the load when the vehicle undergoes an end (rear or front) collision. In particular, wedge-shaped open spaces exist between the interior surfaces of the transverse frame member and the corresponding wall surfaces of the curved parts that face the interior surfaces. Consequently, when the vehicle undergoes an end collision, the inward collapsing of the transverse frame member causes the curved parts to gradually undergo bending deformation while being folded over such that the curved parts touch against the transverse frame member. Deformation control structures are provided on the curved parts to prevent localized stress concentration from occurring and enable the curved parts to deform in a stable manner. Thus, the curved parts are prevented from undergoing acute bending and the input load is absorbed more efficiently.

32 Claims, 34 Drawing Sheets

FOREIGN PATENT DOCUMENTS

| | | | | |
|---|---|---|---|---|
| JP | 05105110 A | * | 4/1993 |
| JP | 06032246 A | * | 2/1994 |
| JP | 06278646 A | * | 10/1994 |
| JP | 2002-356179 A | | 12/2002 |

* cited by examiner

VEHICLE BODY END STRUCTURE

BACKGROUND OF THE INVENTION

1. Field of the Invention

The present invention generally relates to a vehicle body end structure for automobiles. More specifically, the present invention relates to a vehicle body end structure that is configured to absorb the initial energy of an end collision.

2. Background Information

One conventional vehicle body end structure for automobiles is disclosed in Japanese Laid-Open Patent Publication No. 2002-356179 (see, page 3, FIG. 4). In this publication, such a vehicle body front section structure is disclosed that includes structures in which the front ends of the front side members constituting longitudinal frame members and a cross member constituting a transverse frame member are connected together through crush boxes arranged along the axes of the front side members. With such a front section structure, when the vehicle undergoes a front collision, the crush boxes collapse to both absorb the initial energy and stabilize the axial buckling deformation (axial collapse) of the of the front side members.

In view of the above, it will be apparent to those skilled in the art from this disclosure that there exists a need for an improved vehicle body end structure. This invention addresses this need in the art as well as other needs, which will become apparent to those skilled in the art from this disclosure.

SUMMARY OF THE INVENTION

It has been discovered that although absorbing energy by using axial collapse of the longitudinal frame members as just described is effective at suppressing deformation of the cabin of the vehicle in a front collision, there is a tendency for the axial load of the collision to concentrate in the axial direction of the longitudinal frame members during a front collision.

While it is also desirable to suppress the level of damage to both of the vehicles involved in a front collision, when, for example, one vehicle is large and the other is small such that the shapes of the front sections of the vehicles do not match, there is the possibility that insufficient interaction will occur in addition to the aforementioned axial load concentration in the longitudinal frame members.

Therefore, the object of the present invention is to provide a vehicle body end structure that can disperse the load when the vehicle undergoes a vehicle end collision so that the load does not concentrate in the axial direction of the longitudinal frame members and can achieve good transmission of axial loads to the longitudinal frame members even in collisions having small overlap ratios.

The foregoing object can basically be attained by providing a vehicle body end structure in accordance with the present invention that basically comprises a pair of first longitudinal frame members and a first transverse frame member. The first longitudinal frame members are configured and arranged to extend in a lengthwise direction on both widthwise sides of a vehicle. Each of the first longitudinal frame members has an end portion with a curved part. The first transverse frame member has interior surfaces connected to the curved parts of the end portions of the first longitudinal frame members such that the first transverse frame member extends in the widthwise direction of the vehicle. The curved parts are configured and arranged relative to the first transverse frame member such that wedge-shaped open spaces are formed between the interior surfaces of the first transverse frame member and corresponding wall surfaces of the curved parts that face the interior surfaces of the first transverse frame member. Each of the curved parts are provided with a deformation control structure that is arranged and configured to prevent the occurrence of localized stress concentration and enable the curved parts to deform in a stable manner when an end axial load is imparted to the vehicle body end structure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. For example, while the illustrated embodiments are shown as a front end portion of a vehicle, it will be apparent to those skilled in the art from this disclosure that each embodiment of the present invention can be a portion of a rear end portion of a vehicle.

First Embodiment

Referring initially to FIGS. 1–9, a vehicle body end structure is illustrated in accordance with a first embodiment of the present invention. The vehicle body is a unibody construction, i.e., the vehicle body is not mounted on a chassis, but rather the frame is built into the vehicle body.

Figure 1:
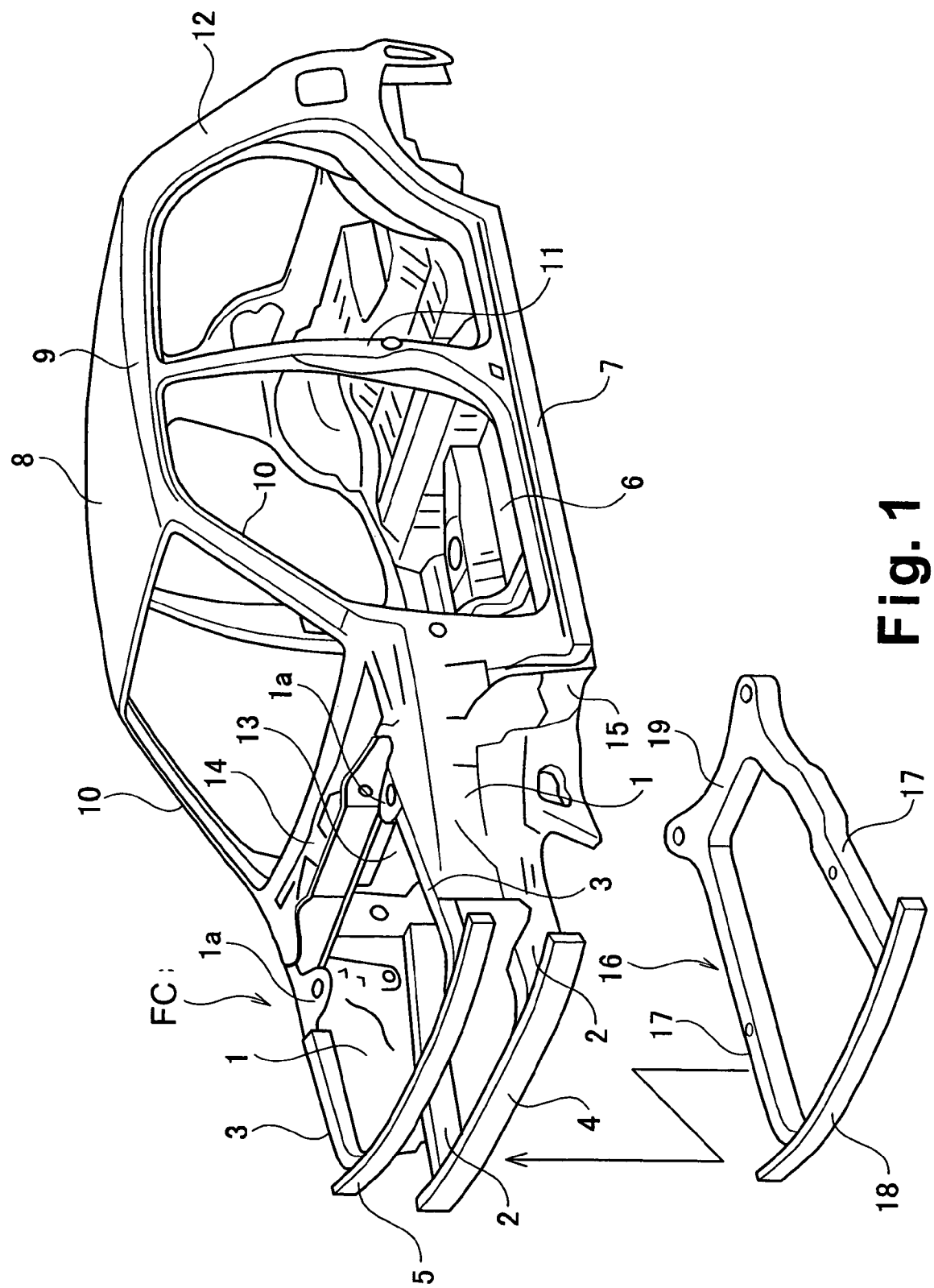
FIG. 1 is a perspective view of a vehicle body showing a vehicle body frame structure of an automobile having a vehicle body front end structure in accordance with a first embodiment of the present invention.
Figure 2:
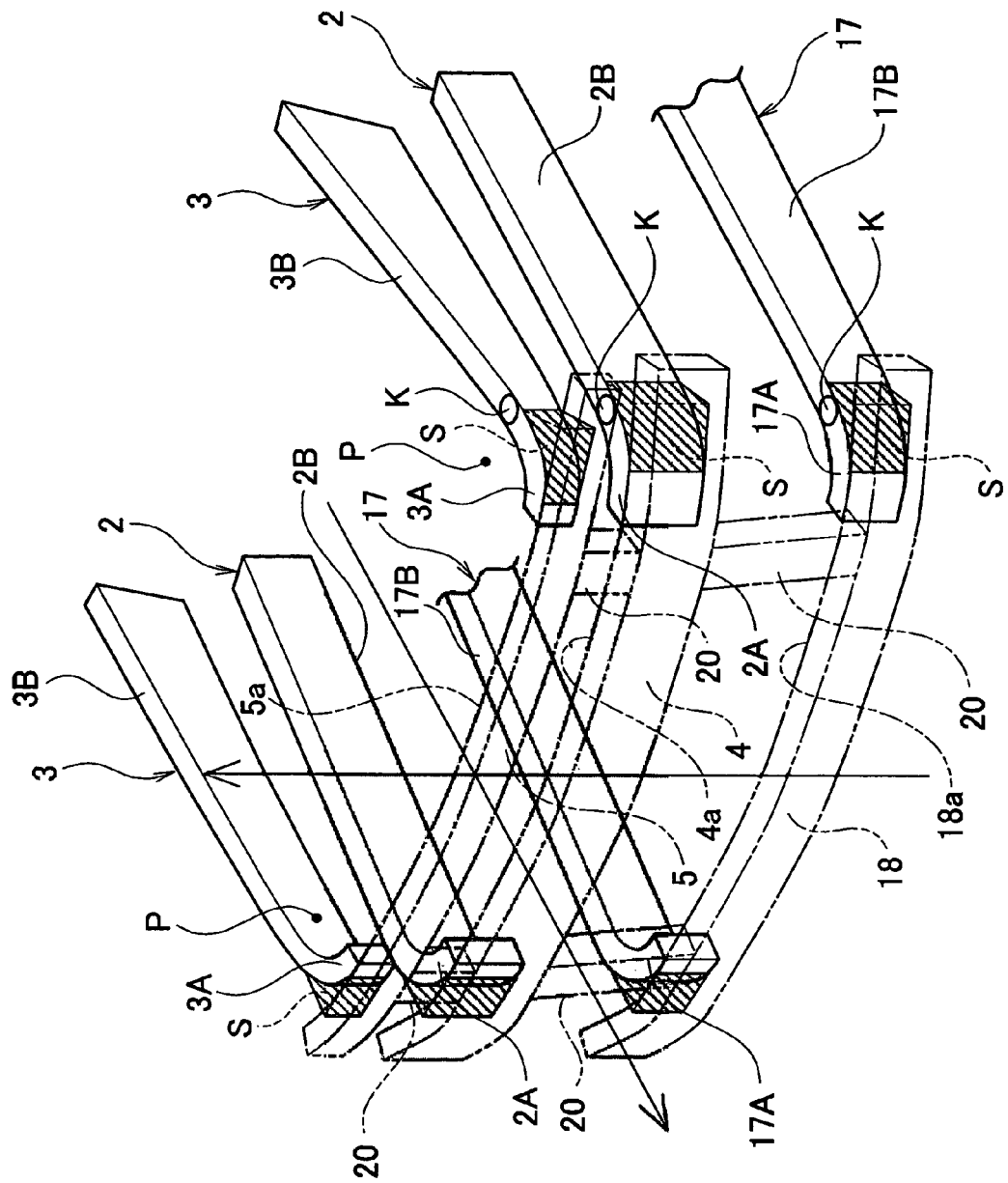
FIG. 2 is an enlarged partial perspective view of selected parts including the front frame members of the vehicle body shown in FIG. 1 in accordance with the first embodiment of the present invention.
Figure 3:
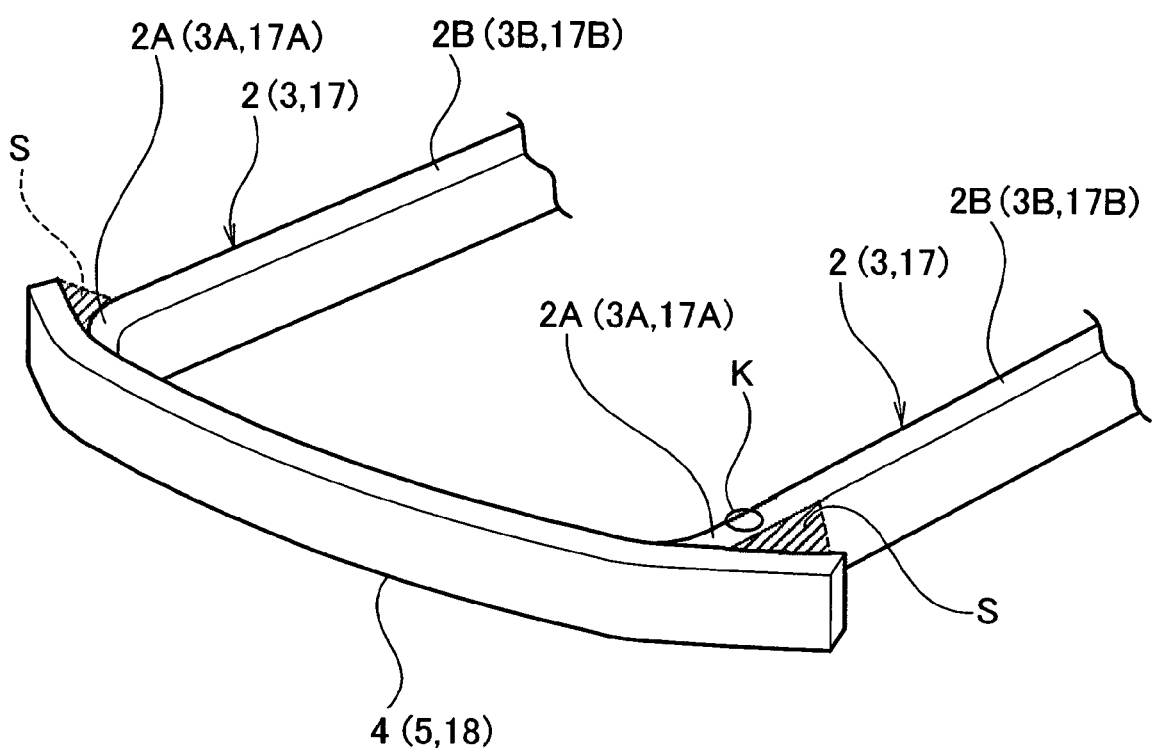
FIG. 3 is an enlarged partial perspective view of one of the longitudinal frame members and one of the transverse frame members of FIG. 2 in accordance with the first embodiment of the present invention.
Figure 4:
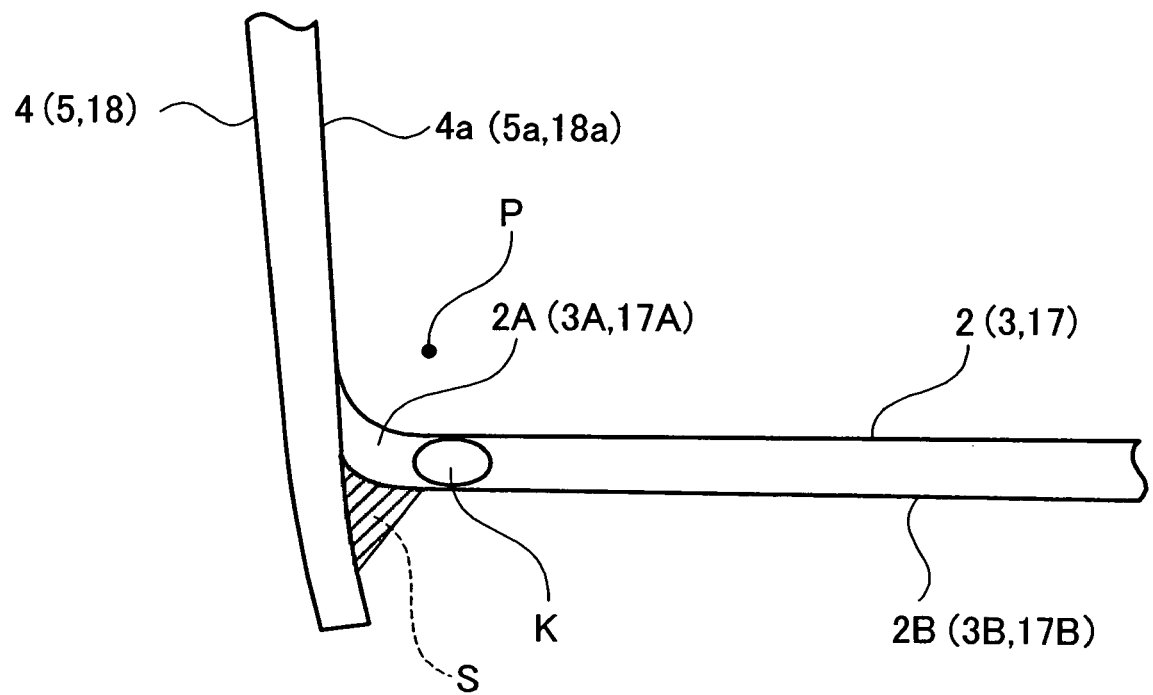
FIG. 4 is an enlarged partial plan view of one of the longitudinal frame members and one of the transverse frame members of FIGS. 1–3 in accordance with the first embodiment of the present invention.
Figure 5:
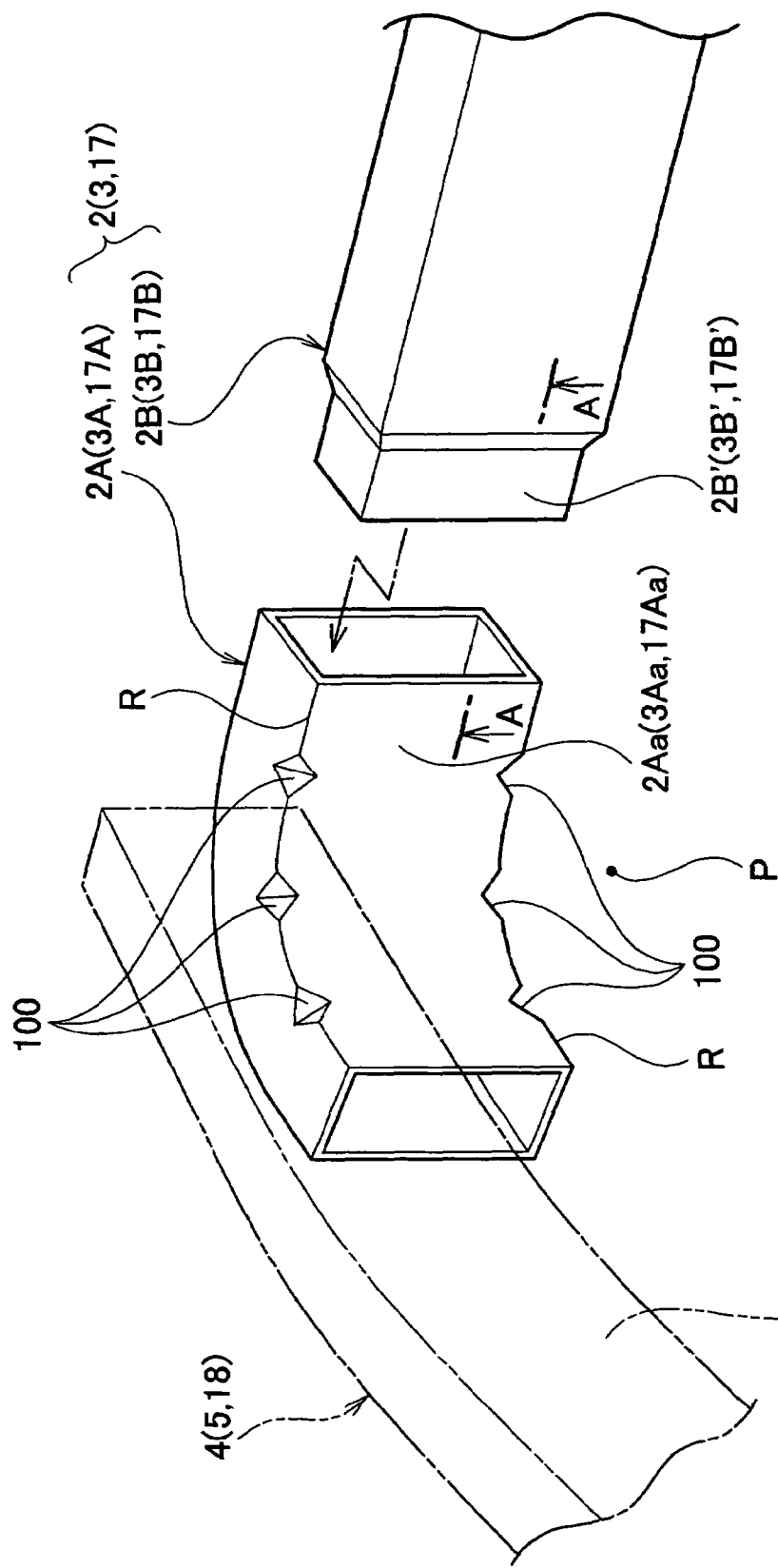
FIG. 5 is an exploded rear perspective view of the curved part of one of the longitudinal frame members and one of the transverse frame members where the curved part of the longitudinal frame member connects to the main portion of the longitudinal frame member in accordance with the first embodiment of the present invention.
Figure 6:
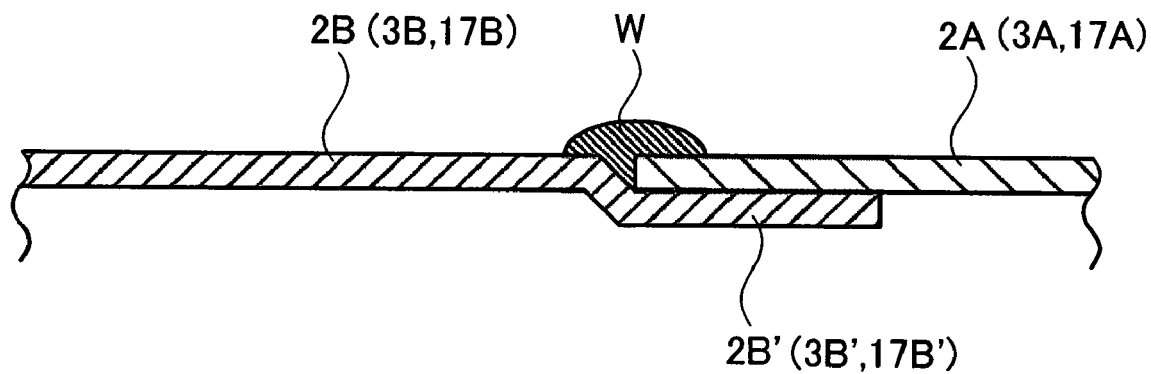
FIG. 6 is a cross sectional view of the curved part of a one of the longitudinal frame members as taken alone section line A—A of FIG. 5.
Figure 7:
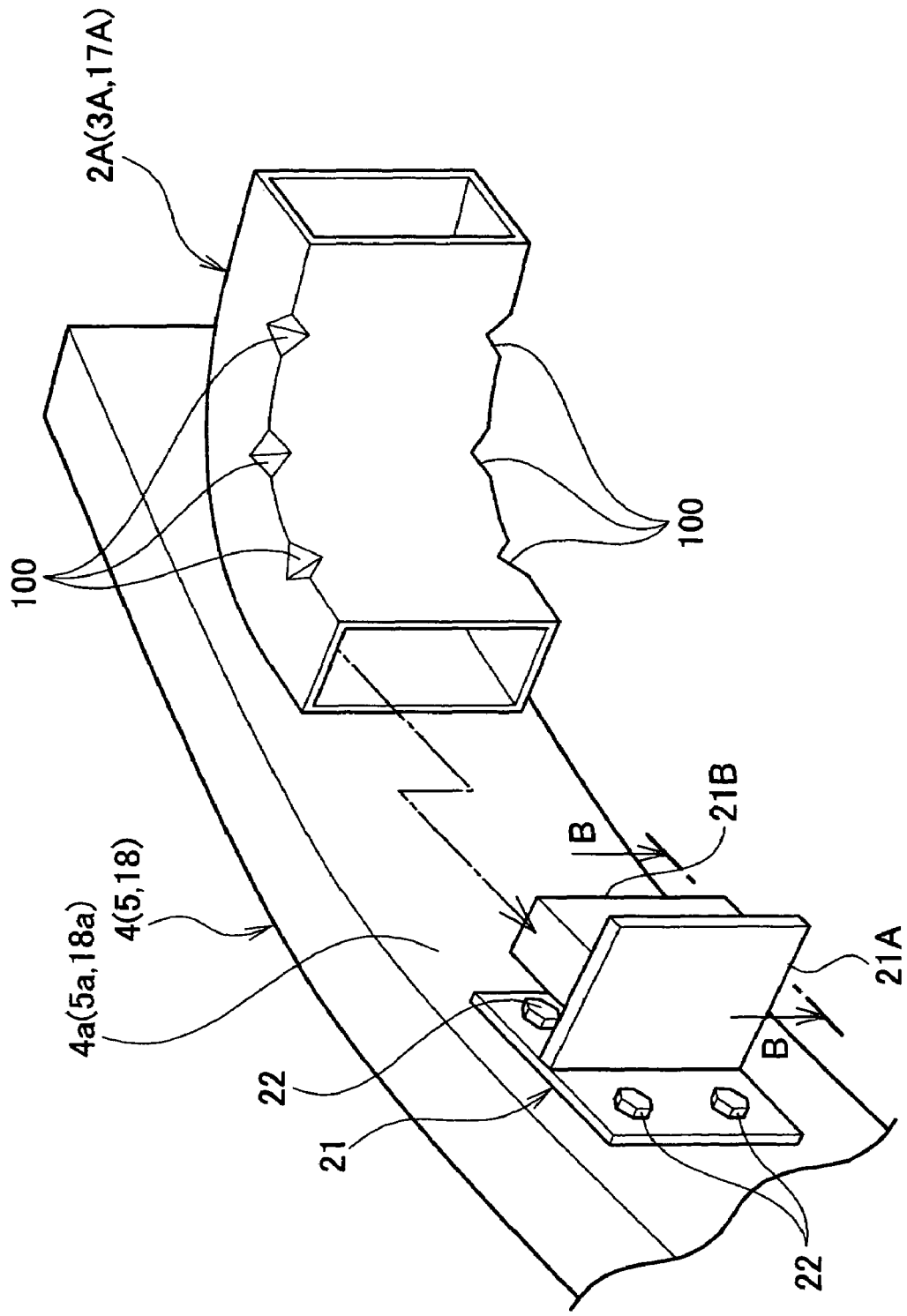
FIG. 7 is an exploded rear perspective view of the curved part of one of the longitudinal frame members and one of the transverse frame members where the curved part of the longitudinal frame member connects to the transverse frame member in accordance with the first embodiment of the present invention.
Figure 8:
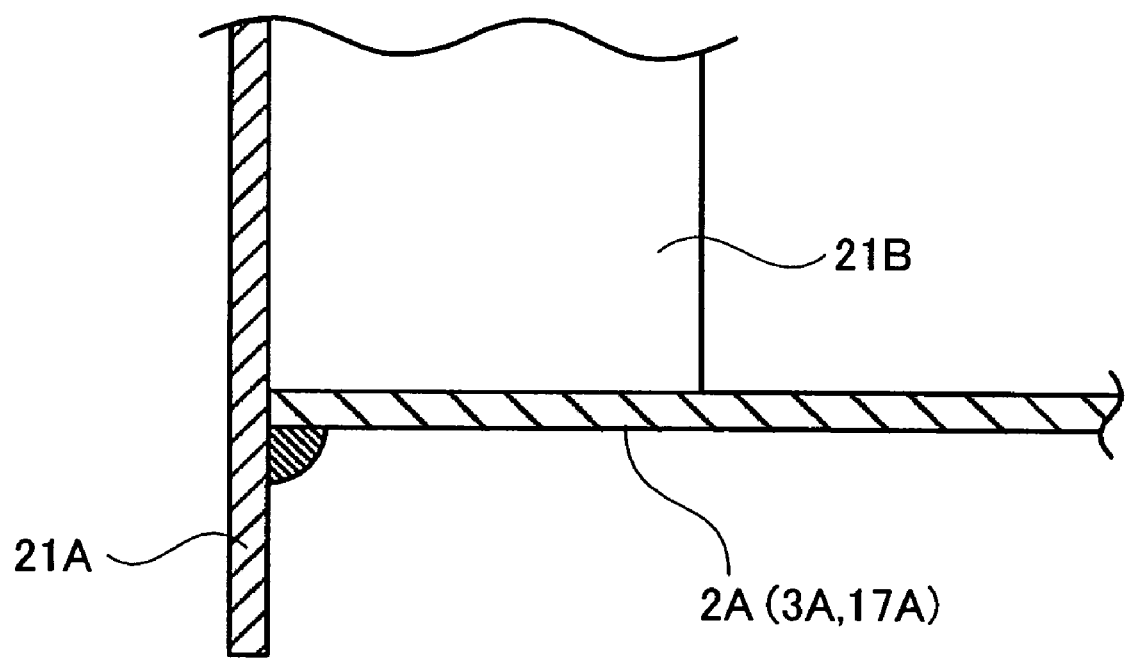
FIG. 8 is a cross sectional view taken of the connection member as taken along section line B—B of FIG. 7.

FIG. 1 is a perspective view of the vehicle body framework structure of an automobile. FIG. 2 is a perspective view showing key features of the framework structure of the front portion of the vehicle body. FIG. 3 is a perspective view of a pair of longitudinal frame members and a transverse frame member extracted from FIG. 2. FIG. 4 is a plan view showing key features of the members shown in FIG. 3; FIG. 5 is an exploded rear perspective view of the curved part of a longitudinal frame member. FIG. 6 is a cross sectional view taken alone section line A—A of FIG. 5. FIG. 7 is an exploded perspective view of the portion where a transverse frame member connects to a longitudinal frame member. FIG. 8 is a cross sectional view taken along section line B—B of FIG. 7. FIG. 9 illustrates the operational action of the first embodiment of the present invention.

As shown in FIG. 1, a vehicle body end structure in accordance with this embodiment basically includes a pair of hood ledge panels 1, a pair of longitudinally arranged front side members 2, a pair of longitudinally arranged hood ledge members 3, a center cross member 4 and an upper cross member 5. The hood ledge panels 1 are integrated with the front side members 2 and the hood ledge members 3 to form a pair of side hood ledge structures. The front side members 2 serving as a first pair of longitudinal frame members joined to bottom edge portions of hood ledge panels 1 forming the left and right side walls of the front compartment FC. The front side members 2 serve as a first pair of longitudinal frame members, while portions of the hood ledge members 3 serve as a second pair of longitudinal frame members. The front side members 2 function as the main energy absorbing members when the vehicle undergoes a front collision. The front side members 2 are preferably formed with closed cross sections.

The hood ledge panels 1 constitute the left and right walls of the front compartment FC. The front side members 2 are joined to the bottom edges of the hood ledge panels 1 and serve as longitudinal frame members extending in the longitudinal direction of the vehicle body.

The front side members 2 are intended to serve as the main energy absorbing members if the vehicle undergoes a front collision. The front side members 2 are formed to have closed cross sectional shapes. The rear end portions of the front side members 2 wrap around the underside of the floor panel 6 from the dash panel 13 and extend rearward as extension side members.

Similarly, the hood ledge members 3 having closed cross sectional structures are joined to the top edges of the hood ledge panels 1 and serve as longitudinal frame members extending in the longitudinal direction of the vehicle body.

The center cross member 4 and the upper cross member 5 are connected to the front ends of the left-right pair of front side members 2 and the left-right pair of hood ledge members 3, respectively, so as to span the space there-between. The two cross members 4 an 5 have closed cross sectional structures and serve as transverse frame members.

The cabin frame structure basically comprises a floor panel 6 with a pair of side sills 7 arranged on the left and right sides of the floor panel 6, a roof panel 8 with a pair of roof side rails 9 arranged on the left and right sides of the roof panel 8, a pair of front pillars 10 arranged on the left and right sides of the roof side rails 9, a pair of center pillars 11, a pair of rear pillars 12 arranged vertically between the side sills 7 and the roof side rails 9 arranged on the left and right sides of the roof side rails 9, a dash panel 13 arranged to extend between the left and right sides of the vehicle body front section structure, a cowl box 14 arranged such that it traverses between the left and right front pillars 10 at the upper edge portion of the dash panel 13 and a pair of outriggers 14. The front side members 2 are connected to the front ends of the side sills 7 through the outriggers 15 at the portions of the front side members 2 where the extension side members extend therefrom.

In this embodiment, the rear ends of the hood ledge members 3 are connected to the strut towers 1a that serve as the framework portions of the hood ledge panels 1 and are thereby linked to the cowl box 14 and the front pillars 10 through the strut towers 1a.

A sub frame 16 is provided in the bottom of the front compartment FC for mounting and supporting a power unit. The sub frame 16 basically includes left and right side frames 17 that serve as longitudinal frame members and a lower cross member 18 that serves as a widthwise or transverse frame member and is connected across the front ends of the left and right side frames 17. In this embodiment, the rear end parts of the left and right side frame members 17 are linked to a rear frame 19 to form a generally rectangular shape or a trapezoidal shape as seen in a top plan view.

The side frames 17, the rear frame 19, and the cross member 18 of the sub frame 16 all have closed cross sectional shapes. A longitudinally intermediate portion of each side frame 17 is connected to the bottom face of the corresponding front side member 2 through a mounting member and a rear end portion of each side frame 17 is connected to the bottom face of the corresponding outrigger 14 through a mounting member.

The transverse frame members, i.e., the center cross member 4, the upper cross member 5, and the lower cross member 18, are arranged such that their front edge positions are aligned vertically as shown in FIG. 2 and are connected together on both sides by vertical stay members 20. The front ends of the longitudinal frame members 2, 3 and 17 are connected to the back surfaces of the transverse frame members 4, 5 and 18.

As seen in FIG. 2, the connections between the longitudinal frame members 2, 3, 17 and the respective transverse frame members 4, 5 and 18, respectively, are preferably identical as shown or substantially identical. The front end portions of the longitudinal frame members 2, 3 and 17 are each provided with a curved part 2A, 3A, 17A that curves at a prescribed curvature about a curvature center P. The curved parts 2A, 3A and 17A constitute the portions of the longitudinal frame members forward of each curvature transition point K established at a position rearward of the portion where the longitudinal frame members is joined to the transverse frame members 4, 5 and 18. The curved parts 2A, 3A and 17A of the longitudinal frame members 2, 3 and 17 are positioned vertically above and below one another and re curved in the same direction. A wedge-shaped open space S is formed between each of the back surfaces 4a, 5a and 18a of each transverse frame member 4, 5 and 18 and the wall surfaces of each curved parts 2A, 3A and 17A that faces the back surfaces 4a, 5a and 18a. In this embodiment, the curved parts 2A, 3A and 17A all curve inward in the widthwise direction of the vehicle from the curvature transition points K.

For convenience and simplicity, the connections between the longitudinal frame members 2, 3 and 17 and the respective transverse frame members 4, 5 and 18, respectively, are illustrated in FIGS. 3 to 8 using the front side members 2 and the center cross member 4 as an example for each of the connections. In other words, similar structures are also used for the connections between the other longitudinal frame members and transverse frame members, i.e., the hood ledge members 3, the upper cross member 5, the side frames 17, and the lower cross member 18.

As shown in FIGS. 3 and 4, the front ends of the front side members 2 are connected to the rear face of the center cross member 4 as shown in FIGS. 3 and 4. Similar configurations are used for the connections between the hood ledge members 3 and the upper cross member 5, and the connections between the side frames 17 and the lower cross member 18. The reference numerals of the frame ledge members 3, the side frames 17, and other members corresponding thereto are indicated in parentheses after the reference numerals of the front side members 2 and members corresponding thereto. In short, in the explanation that follows, the front side members 2, the hood ledge members 3, and the side frames 17 will be described collectively as longitudinal frame members and the center cross member 4, the upper cross member 5, and the lower cross member 18 will be described collectively as transverse frame members.

As shown in FIG. 4, the curved part 2A (3A, 17A) is formed by curving the front end portion from a curvature transition point K located in a position further toward the rear of the vehicle body than the portion where the transverse frame member 4 (5, 18) connects to the curved part 2A (3A, 17A). Preferably, the curved part 2A (3A, 17A) is curved about a center of curvature P in such a manner as to have a prescribed curvature. Thus, a wedge-shaped open space S (indicated as cross hatched portions in FIGS. 2 to 4) is formed between the rear face 4a (5a, 18a) of the transverse frame member 4 (5, 18) and the wall faces of the curved part 2A (3A, 17A) that face the rear face 4a (5a, 18a) of the transverse frame member 4 (5, 18).

Each of the curved parts 2A, 3A and 17A is curved in the transversely inward direction of the vehicle from the curvature transition point K, and has the form of a pipe with a rectangular cross section that is joined in an uninterrupted manner to the main portion 2B (3B, 17B) of the front side member 2, the hood ledge member 3, and the side frame 17, respectively. As shown in FIG. 5, the curved part 2A (3A, 17A) is made as a separate entity from the main portion 2B (3B, 17B) and is connected to the front end of the main portion 2B (3B, 17B), the portion where the two portions connect corresponding generally to the portion where the curvature transition point K exists.

As shown in FIG. 6, the front end of the main portion 2B (3B, 17B) is provided with a narrow part 2B' (3B', 17B') that is smaller by approximately the wall thickness of the main portion 2B (3B, 17B). The rear end opening of the curved part 2A, 3A, 17A is fitted over the narrow part 2B', 3B', 17B' and the curved part 2A, 3A, 17A is secured to the main portion 2B (3B, 17B) with a weld W applied around the edge of the tip end of the curved part 2A (3A, 17A).

Meanwhile, as shown in FIGS. 3 and 4, at least the free end tip portion of the transverse frame member 4 (5, 18) in the general vicinity of where the same is connected to the front end of the curved part 2A (3A, 17A) of the longitudinal frame member 2 (3, 17) are curved rearward in a top plan view.

In the first embodiment, as shown in FIG. 5, the curved part 2A (3A, 17A) of each longitudinal frame member 2 (3, 17) is provided with notches 100 serving as a deformation control structure or points of weakening that controls the deformation of the longitudinal frame member 2 (3, 17) in a desired manner. Preferably, the notches 100 are arranged and configured to prevent the occurrence of localized stress concentration and enable the curved part 2A (3A, 17A) to deform in a stable manner when a load is imparted to the vehicle body end structure from the front. The notches 100 are formed in the upper and lower ridge lines R of the rectangular cross section of the curved part 2A (3A, 17A) on the side thereof corresponding to the inner face 2Aa (3Aa, 17Aa) of the curved part 2A (3A, 17A) that faces toward the center of curvature P. The notches 100 are plural in number (three per ridge line R in this embodiment) and spaced appropriately in the longitudinal direction.

One preferred method of connecting the longitudinal frame members 2, 3 and 17 to the transverse frame members 4, 5 and 18 is illustrated in FIGS. 7 and 8. The longitudinal frame member 2 (3, 17) is connected to the transverse frame member 4 (5, 18) by fastening a bracket 21 that is T-shaped in a plan view to the back surface of the transverse frame member 4 (5, 18) with a plurality of bolts 22. A protruding plug part 21B is provided on a bearing piece 21A of the bracket 21. The protruding plug part 21B of the bracket 21 is fitted into the terminal opening of the curved part 2A (3A, 17A). The longitudinal frame member 2 (3, 17) is preferably fixed to the corresponding bracket 21 by welding the perimeter of the terminal opening to the bearing piece 21A.

Figure 9A:
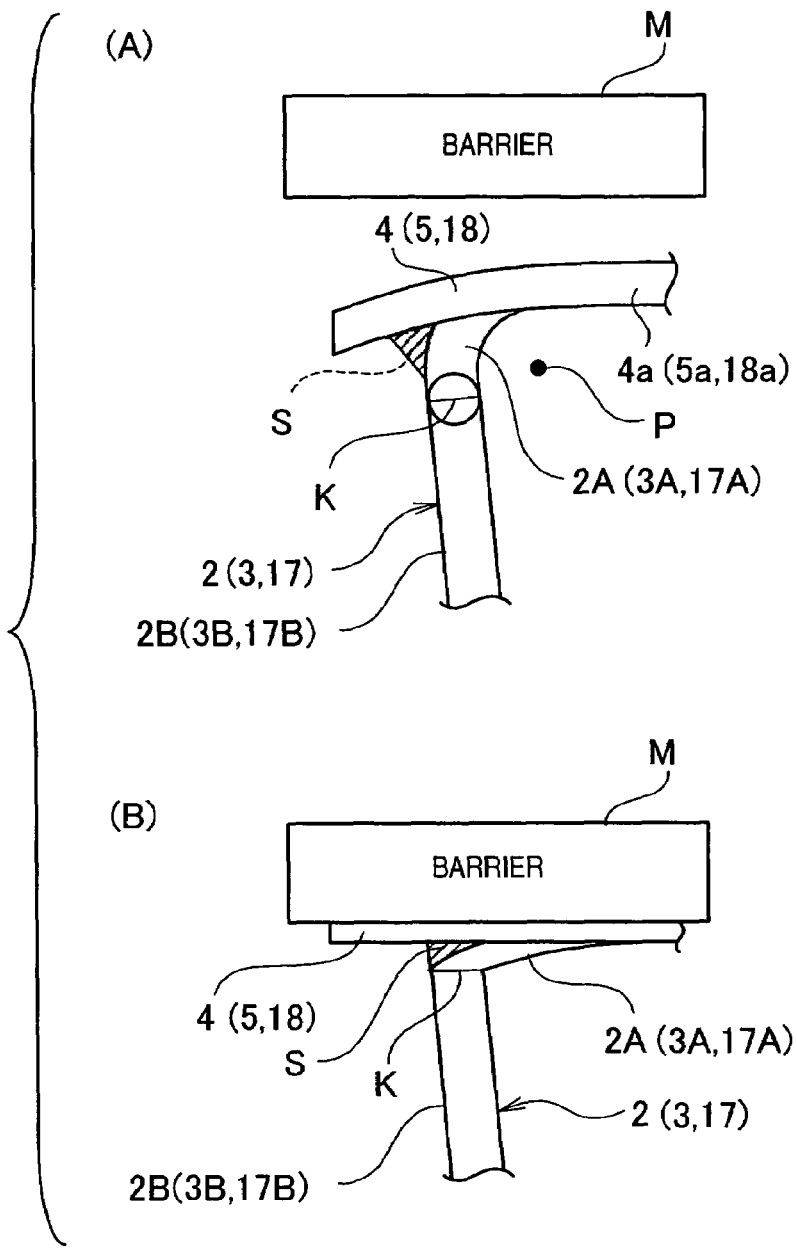
FIG. 9A is a partial top schematic plan view of the front frame members of the vehicle body constructed according to FIGS. 1–8 and that illustrates the operation of the front frame members of the vehicle body in accordance with the present invention.
Figure 9B:
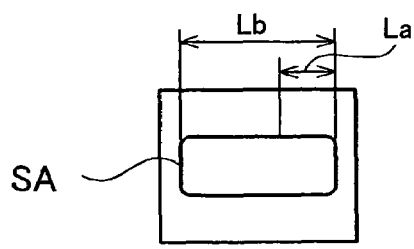
FIG. 9B is a partial schematic view of the one front side members of the vehicle body constructed according to FIGS. 1–8 in accordance with the present invention.

The transverse frame members 4, 5 and 18 and the longitudinal frame member 2, 3 and 17 of a vehicle body end structure in accordance with the first embodiment are thus arranged and configured such that wedge-shaped open spaces S exist between the rear faces 4a, 5a and 18a of the transverse frame members 4, 5 and 18 and the wall face of the curved parts 2A, 3A and 17A of each of the longitudinal frame members 2, 3 and 17 that faces toward the rear faces 4a, 5a and 18a. Thus, when the vehicle undergoes a front collision and the transverse frame member 4 (5, 18) retreats rearward from the state shown in part (A) of FIG. 9A to the state shown in part (B) of FIG. 9A, the curved part 2A (3A, 17A) bends (deforms) progressively and gradually while folding over such that the wall face thereof that faces the rear face 4a (5a, 18a) comes in contact with the rear face 4a (5a, 18a). As shown in FIG. 9B, the collision contact surface area SA increases on the side of the curved part 2A (3A, 17A) opposite the side where the center of curvature P is located, i.e., the initial non-deformed length La increases to the deformed length Lb. Thus, the load is dispersed in the direction in which the contact surface area SA increases, thereby enabling the concentration of axial loads in the longitudinal frame members 2, 3 and 17 to be avoided.

During the initial stage of an end collision with a colliding object M, the curved parts 2A, 3A, 17A undergo bending deformation. When the curved parts 2A, 3A and 17A have bent to the curvature transition point K, the main portions 2B, 3B and 17B begin to undergo axial buckling deformation in bellows-like manner. The collision energy is absorbed by the bending deformation and the axial collapse deformation.

Since notches 100 are provided on the curved parts 2A, 3A and 17A of this embodiment as a deformation control structure, the bending deformation that occurs when the frontal collision load is imparted is dispersed among three deformation origin points arranged in the longitudinal direction. Thus, the concentration of stress at one location along the curved parts 2A, 3A and 17A can be prevented and the deformation of the curved parts 2A, 3A and 17A can take place in a stable manner. Since the notches 100 are formed in the ridge lines R with a prescribed spacing, the wall face is divided into a plurality of sections by the notches 100 and the deformation of the curved parts 2A, 3A and 17A can be stabilized by increasing the surface rigidity of the curved parts 2A, 3A and 17A in a sectional manner. Therefore, since the curved parts 2A, 3A and 17A are prevented from deforming acutely in a single location and, instead, are allowed to come into contact with the rear faces 4a, 5a and 18a of the transverse frame members 4, 5 and 18 gradually, the contact surface area increases steadily over time and the efficiency with which the collision load energy is absorbed can be increased.

Since the concentration of axial loads in the longitudinal frame members 2, 3 and 17 are avoided, the vehicle body end structure of this embodiment is more effective at reducing the degree of damage to the front end of the vehicle body. Also when the colliding object M is another vehicle, the degree of damage to the other vehicle M can also be minimized in comparison with conventional vehicle body end structures.

Since the curved parts 2A, 3A and 17A bend at the portion corresponding to the open spaces S and the collision contact surface area can increase on the side corresponding to the open spaces S, the axial load is reliably transmitted to the longitudinal frame members 2, 3 and 17 due to the increased collision surface area, even if the collision is of such a nature that the overlap ratio between the longitudinal frame members of the two vehicles is small. Consequently, an efficient collision energy absorption function can be exhibited.

Since wedge-shaped open spaces S exist between the rear face of the transverse frame members 4, 5 and 18 and the wall faces of the curved parts 2A, 3A and 17A of the longitudinal frame members 2, 3 and 17 that face the rear face of the transverse frame members 4, 5 and 18, when the vehicle undergoes a front collision and the transverse frame members 4, 5 and 18 retreats rearward, the curved parts 2A, 3A and 17A fold over as the bending deformation progresses such that the wall faces thereof contact the rear face of the transverse frame members 4, 5 and 18. Thus, the collision contact surface area increases on the sides of the curved parts 2A, 3A and 17A opposite the sides where the centers of curvature thereof are located and the load is dispersed in the direction in which the contact surface area increases, thereby enabling the concentration of axial loads in the longitudinal frame members to be avoided.

During this deformation process, the deformation control structures function to prevent the occurrence of localized stress concentration caused by the frontal load input and enable the curved part to deform in a stable manner. Since sudden localized bending deformation of the curved parts 2A, 3A and 17A is prevented and the curved parts 2A, 3A and 17A come into contact with the rear surface of the transverse frame members 4, 5 and 18 gradually, the contact surface area can increase in a stable manner over time and the efficiency with which the energy of the input load is absorbed can be improved.

Since the deformation control structure of this embodiment comprises merely a plurality of notches 100 formed along the ridge lines R of the curved parts 2A, 3A and 17A, the objective of the deformation control structure is achieved with a simple structure. Thus, the deformation control structure can be fabricated easily and an inexpensive vehicle body can be obtained.

Since this embodiment improves the efficiency with which the curved parts 2A, 3A and 17A absorb energy during a collision, the cabin deformation can be efficiently minimized and the collision performance of the vehicle body can be improved without greatly increasing the weight of the vehicle body.

First Variation of the First Embodiment

Figure 10:
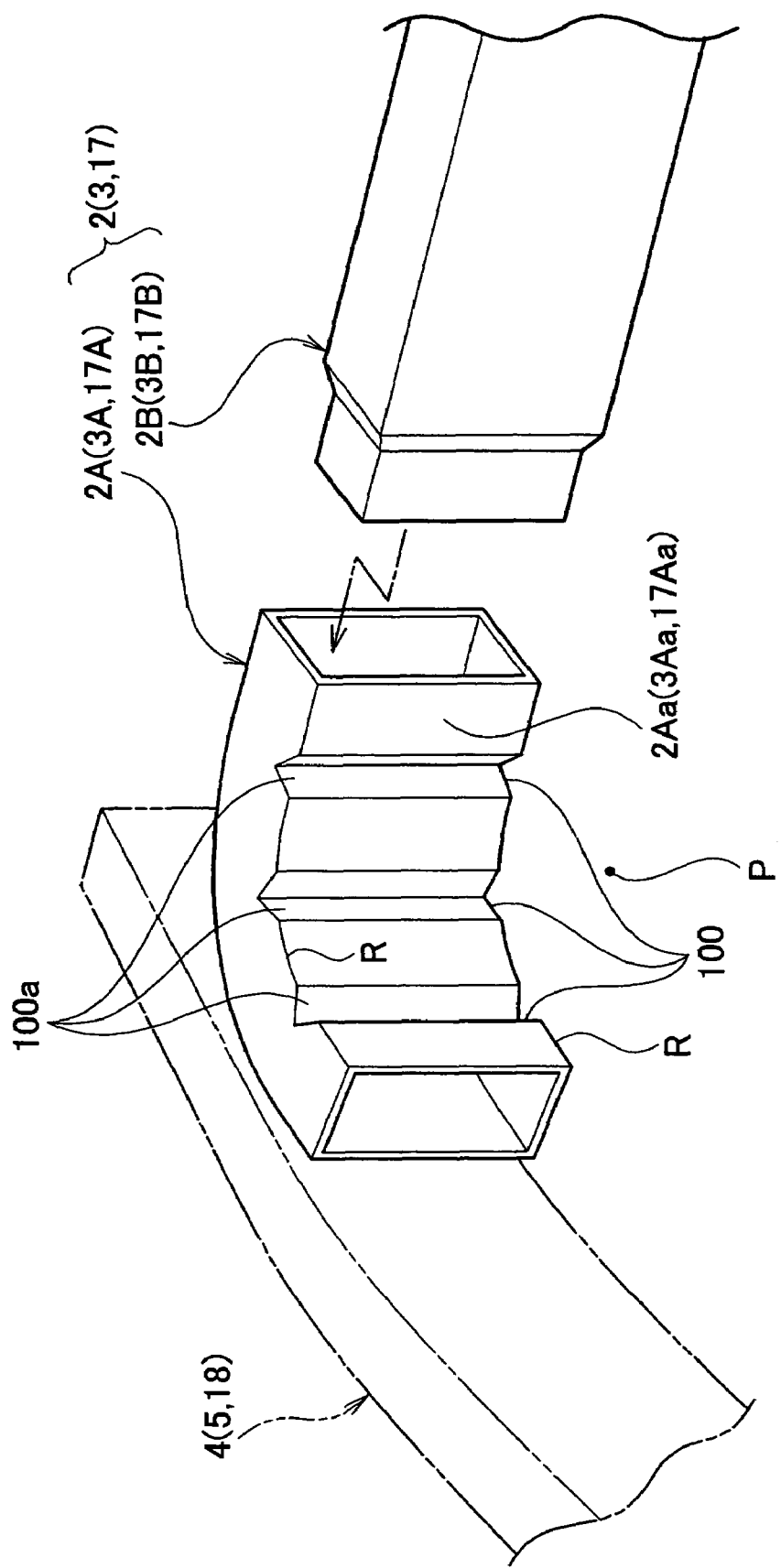
FIG. 10 is an exploded rear perspective view of the curved part of one of the longitudinal frame members and one of the transverse frame members where the curved part of the longitudinal frame member connects to the main portion of the longitudinal frame member in accordance with a first variation of the first embodiment of the present invention.

Referring now to FIG. 10, a portion of a vehicle body end structure in accordance with a first variation of the first embodiment will now be explained. Basically, the vehicle body front end structure of this first variation of the first embodiment is identical to the first embodiment, discussed above, except for using modified curved parts 2A, 3A and 17A for each of the longitudinal frame members 2, 3 and 17 as explained below. The other constituent features are the same as in the first embodiment. In view of the similarity between the first embodiment and this variation, the parts of this variation that are identical to the parts of the first embodiment will be given the same reference numerals as the parts of the first embodiment. Thus, the descriptions of parts that are identical to the parts previously described may be omitted for the sake of brevity.

FIG. 10 is an exploded rear perspective view of the curved part of a longitudinal frame member. As shown in FIG. 10, several groove-like notches 100*a* (three in this embodiment) are formed in the inner face 2Aa (3Aa, 17Aa) of the curved part 2A (3A, 17A) that faces toward the center of curvature P. The notches 100*a* are spaced appropriately in the longitudinal direction and arranged so as to be substantially perpendicular to the ridge lines R. Since the inner face 2Aa (3Aa, 17Aa) of the curved part 2A (3A, 17A) that faces toward the center of curvature P is divided into multiple sections by the notches 100*a*, the surface rigidity of the curved part 2A (3A, 17A) is increased in a sectional manner and the deformation of the same can be stabilized. Thus, this first variation achieves substantially the same operational effects as the first embodiment.

Second Variation of the First Embodiment

Figure 11:
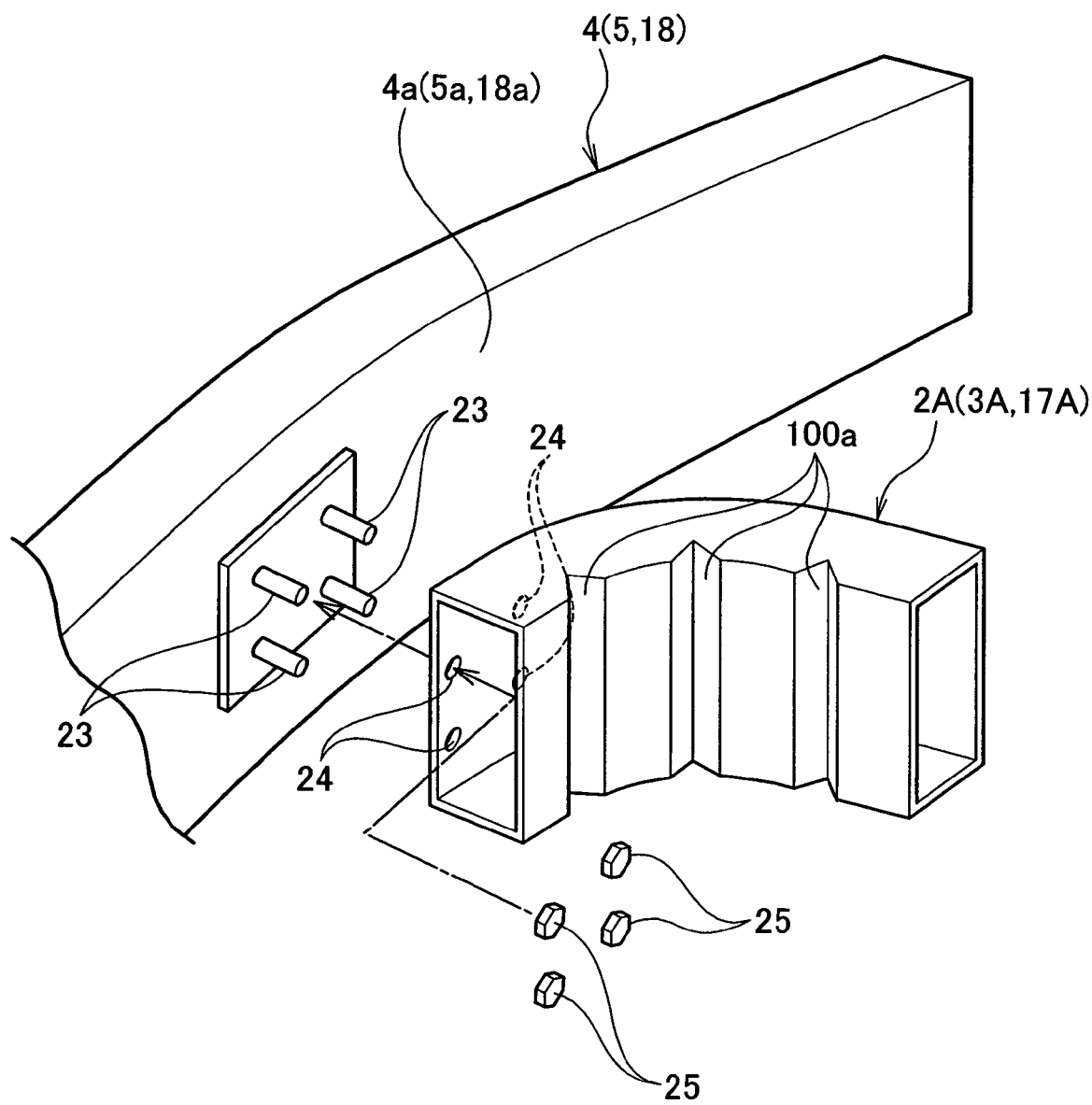
FIG. 11 is an exploded rear perspective view of the curved part of one of the longitudinal frame members and one of the transverse frame members where the curved part of the longitudinal frame member connects to the transverse frame member in accordance with a second variation of the first embodiment of the present invention.

Referring now to FIG. 11, a portion of a vehicle body end structure in accordance with a second variation of the first embodiment will now be explained. Basically, the vehicle body front end structure of this second variation of the first embodiment is identical to the first embodiment, discussed above, except for using modified curved parts 2A, 3A and 17A for each of the longitudinal frame members 2, 3 and 17 as explained below. The other constituent features are the same as in the first embodiment. In view of the similarity between the first embodiment and this variation, the parts of this variation that are identical to the parts of the first embodiment will be given the same reference numerals as the parts of the first embodiment. Thus, the descriptions of parts that are identical to the parts previously described may be omitted for the sake of brevity.

FIG. 11 is an exploded rear perspective view of the curved part 2A (3A, 17A) of the longitudinal frame member 2 (3 and 17) and the transverse frame member 4 (5, 18) where the curved part 2A (3A, 17A) of the longitudinal frame member 2 (3 and 17) connects to the transverse frame member 4 (5, 18). Thus, the second variation of the first embodiment is basically the first variation with a modified connection between the curved part 2A (3A, 17A) of the longitudinal frame member 2 (3 and 17) and the transverse frame member 4 (5, 18) where the curved part 2A (3A, 17A) of the longitudinal frame member 2 (3 and 17) connects to the transverse frame member 4 (5, 18).

In the second variation, as shown in FIG. 11, a plurality of stud bolts 23 are provided so as to protrude from the rear face 4*a* (5*a*, 18*a*) of the transverse frame member 4 (5, 18) and a plurality of bolt holes 24 are provided in the outer face 2Ab (3Ab, 17Ab) of the curved part 2A (3A, 17A) near the terminal end thereof. The curved part 2A (3A, 17A) is fastened to the transverse frame member 4 (5, 18) by passing stud bolts 23 through the bolt holes 24 and installing nuts 25 onto the stud bolts 23. In this way, the longitudinal frame member 2 (3, 17) is connected to the transverse frame member 4 (5, 18) and substantially the same operational effects as the first embodiment are obtained.

Although the description presented above is for a case in which the second variation is applied to a curved part 2A (3A, 17A) having groove-like notches 100a provided in the inner face 2Aa, 3Aa, 17Aa thereof in the manner of the first variation (shown in FIG. 10), the second variation can also be applied to a curved part 2A (3A, 17A) having notches 100 cut into the ridge lines R thereof in the manner of the first embodiment (shown in FIG. 5).

Third Variation of the First Embodiment

Figure 12:
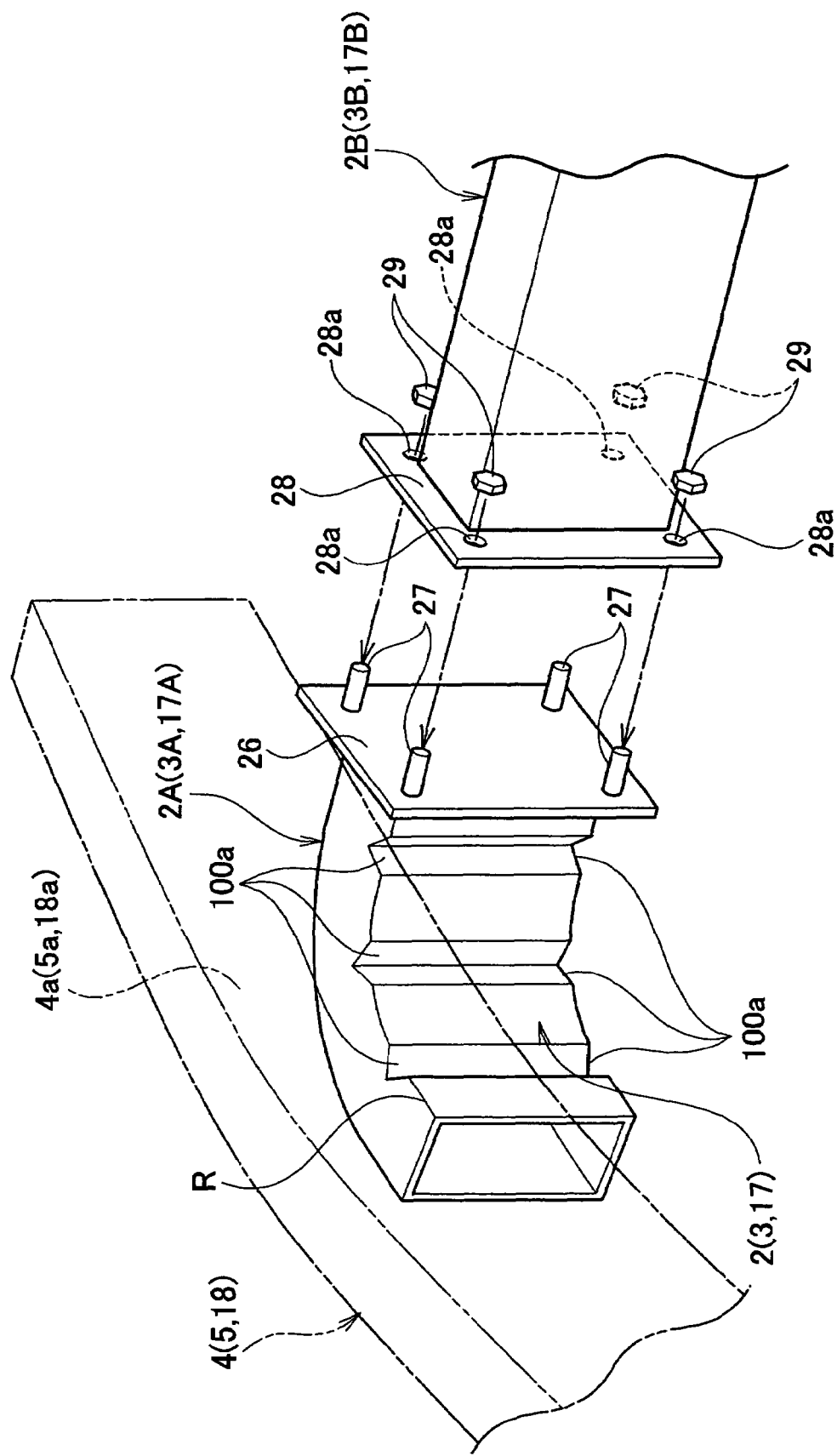
FIG. 12 is an exploded rear perspective view of the curved part of one of the longitudinal frame members and one of the transverse frame members where the curved part of the longitudinal frame member connects to the main portion of the longitudinal frame member in accordance with a third variation of the first embodiment of the present invention.

Referring now to FIG. 12, a portion of a vehicle body end structure in accordance with a third variation of the first embodiment will now be explained. Basically, the vehicle body front end structure of this third variation of the first embodiment is identical to the first embodiment, except for using modified curved parts 2A, 3A and 17A as explained below. The other constituent features are the same as in the first embodiment. In view of the similarity between the first embodiment and this variation, the parts of this variation that are identical to the parts of the first embodiment will be given the same reference numerals as the parts of the first embodiment. Thus, the descriptions of parts that are identical to the parts previously described may be omitted for the sake of brevity.

FIG. 12 is an exploded rear perspective view of the curved part 2A (3A, 17A) of the longitudinal frame member 2 (3 and 17) and the transverse frame member 4 (5, 18) where the curved part 2A (3A, 17A) of the longitudinal frame member 2 (3 and 17) connects to the main portion of the longitudinal frame member 2 (3 and 17). In the third variation, as shown in FIG. 12, an end plate 26 provided with a plurality of stud bolts 27 is secured to the rear end of the curved part 2A (3A, 17A) and an end plate 28 provided with a plurality of bolt holes 28a is fixed to the front end of the main portion 2B (3B, 17B). The curved part 2A (3A, 17A) is fastened to the main portion 2B (3B, 17B) by passing stud bolts 27 through the bolt holes 28a and installing nuts 29 onto the stud bolts 27 such that the end plates 26 and 28 are flat against each other. In this way, the curved part 2A (3A, 17A) is connected the main portion 2B (3B, 17B) of the longitudinal frame member 2 (3, 17) and substantially the same operational effects as the first embodiment are obtained.

Although the description presented above is for a case in which the third variation is applied to a curved part 2A (3A, 17A) having groove-like notches in the manner of the first variation (shown in FIG. 10), the third variation can also be applied to a curved part 2A (3A, 17A) having notches 100 cut into the ridge lines R thereof in the manner of the first embodiment (shown in FIG. 5).

Although the first embodiment and the first to third variations thereof all illustrate curved parts 2A, 3A and 17A having rectangular cross sectional shapes, the invention is not limited to such a configuration. It is acceptable for the curved parts 2A, 3A and 17A to have generally any polygonal cross sectional shape. It is also acceptable for the notches provided in the inner face 2Aa (3Aa, 17Aa) that faces toward the center of curvature P or the notches provided in the upper and lower ridge lines R of the inner face 2Aa (3Aa, 17Aa) to be of any number and arrangement so long as the number is plural and the notches are perpendicular or approximately perpendicular to the ridge lines R.

Second Embodiment

Figure 13:
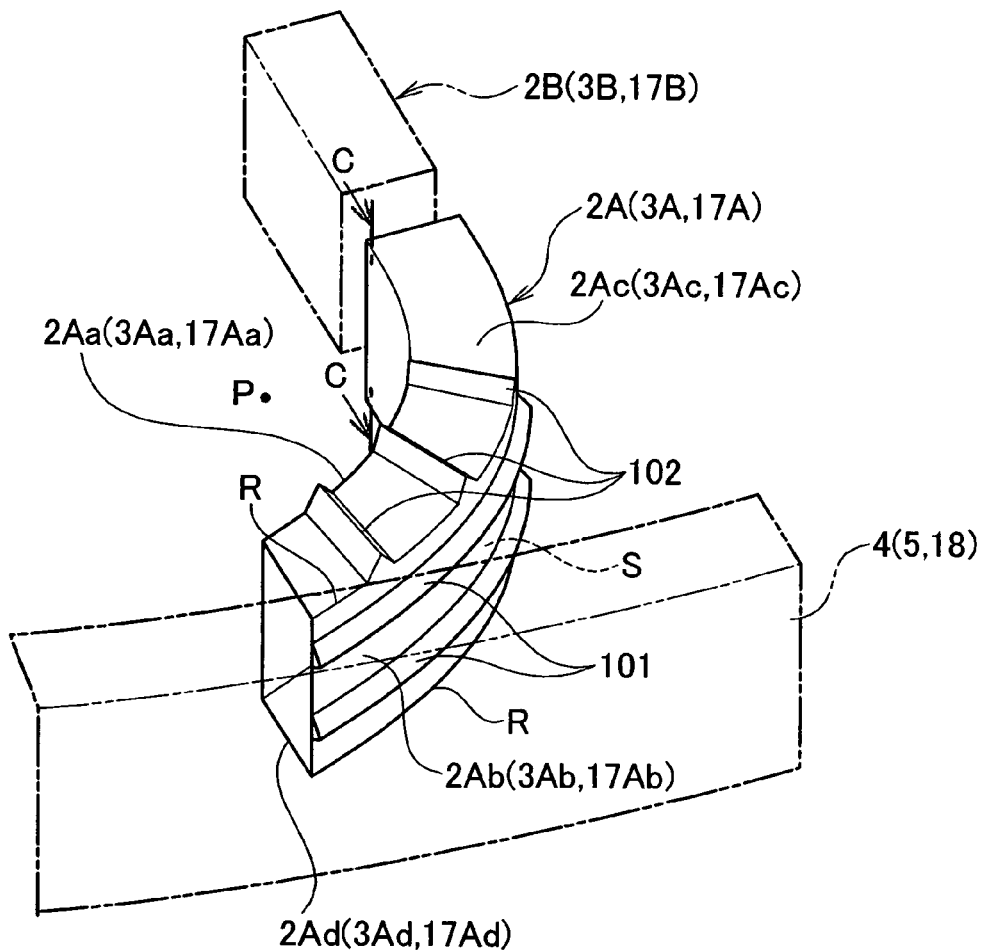
FIG. 13 is an exploded frontal perspective view of a curved part of a longitudinal frame member in accordance with a second embodiment of the present invention.
Figure 14:
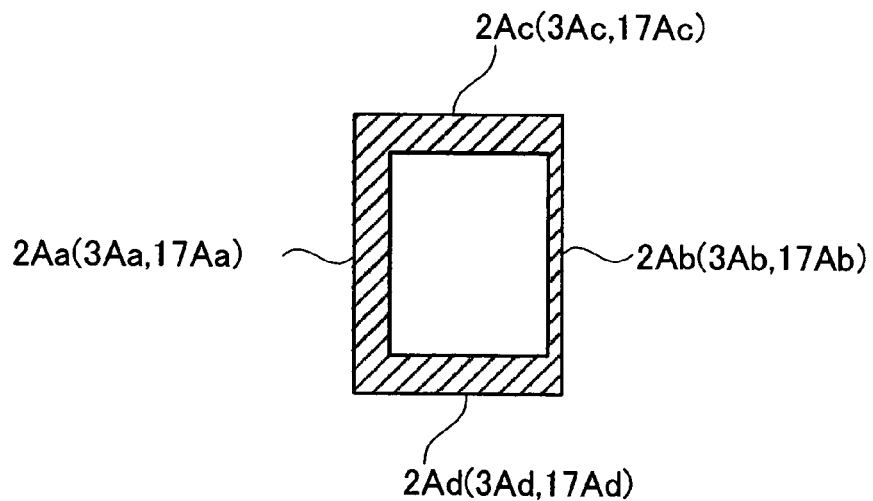
FIG. 14 is a cross sectional view of the curved part of the longitudinal frame member as taken along the section line C—C of FIG. 13 in accordance with the second embodiment of the present invention.

Referring now to FIGS. 13 and 14, a portion of a vehicle body end structure in accordance with a second embodiment will now be explained. Basically, the vehicle body front end structure of this second embodiment is identical to the second embodiment, except for using a modified curved part 2A (3A, 17A) as explained below. The other constituent features are the same as in the first embodiment. In view of the similarity between the first embodiment and this embodiment, the parts of this embodiment that are identical to the parts of the first embodiment will be given the same reference numerals as the parts of the first embodiment. Thus, the descriptions of parts that are identical to the parts previously described may be omitted for the sake of brevity.

FIG. 13 shows an exploded frontal perspective view of the curved part of a longitudinal frame member 2 (3 and 17), while FIG. 14 shows a cross sectional view taken along the section line C—C of FIG. 13. In the vehicle body end structure of the second embodiment, as shown in FIG. 13, the curved part 2A (3A, 17A) has a rectangular cross sectional shape and the deformation control structure comprises one or more beads or raised ridges 101 and 102 provided on the outer face 2Ab (3Ab, 17Ab), the upper face 2Ac (3Ac, 17Ac), and the lower face 2Ad (3Ad, 17Ad). The beads or raised ridges 101 and 102 function to increase the rigidity of the faces on which they are provided.

The beads or raised ridges 101 are two in number and formed in such a manner as to protrude outward from the outer face 2Ab (3Ab, 17Ab) of the curved part 2A (3A, 17A) and run substantially parallel to the ridge lines R. The other beads or raised ridges 102 formed on the upper and lower faces 2Ac (3Ac, 17Ac) and 2Ad (3Ad, 17Ad) are each three in number and formed in such a manner as to protrude outward and run substantially perpendicular to the ridge lines R. As shown in FIG. 14, the curved part 2A (3A, 17A) is formed such that the wall thicknesses of the upper and lower faces 2Ac (3Ac, 17Ac) and 2Ad (3Ad, 17Ad) are larger than the wall thicknesses of the inner face 2Aa (3Aa, 17Aa) and the outer face 2Ab (3Ab, 17Ab).

Similarly to the first embodiment, the curved part 2A (3A, 17A) of the second embodiment is formed as a separate entity from the main portion 2B (3B, 17B) and the two portions can be connected together in the manner of the first embodiment shown in FIG. 5 by fitting the rear open end of the curved part 2A (3A, 17A) over the main portion 2B (3B, 17B) and welding the two portions together or in the manner of the third variation of the first embodiment shown in FIG. 12 by using nuts 29 to fasten together end plates 26 and 28 that are fixed to the rear end of the curved part 2A (3A, 17A) and the front end of the main portion 2B (3B, 17B), respectively.

Meanwhile, the curved part 2A (3A, 17A) can be connected to the transverse frame member 4 (5, 18) in the manner of the first embodiment as shown in FIG. 7 by fitting the plug part 21B of a bracket 21 fixed to the rear face of the transverse frame member 4 (5, 18) into the open end of the curved part 2A (3A, 17A) and welding the two together or in the manner of the second variation of the first embodiment as shown in FIG. 11 by inserting stud bolts 23 provided on the rear face 4a (5a, 18a) of the transverse frame member 4 (5, 18) through bolt holes 24 provided in the curved part 2A (3A, 17A) and securing the bolts 23 with nuts 25.

Thus, the beads or raised ridges 101 and 102 provided on the outer face 2Ab (3Ab, 17Ab), the upper face 2Ac (3Ac, 17Ac), and the lower face 2Ad (3Ad, 17Ad) function to increase the rigidity of the faces on which they are provided and thereby control the deformation mode of the curved part 2A (3A, 17A). As a result, the vehicle body end structure of the second embodiment exhibits substantially the same operational effects as the first embodiment.

Since the curved part 2A (3A, 17A) is formed such that the wall thicknesses of the upper and lower faces 2Ac (3Ac, 17Ac) and 2Ad (3Ad, 17Ad) are larger than the wall thicknesses of the inner face 2Aa (3Aa, 17Aa) and the outer face 2Ab (3Ab, 17Ab), the bending moments that act on the inner face 2Aa (3Aa, 17Aa) and the outer face 2Ab (3Ab, 17Ab) of the curved part 2A (3A, 17A) during deformation caused by a collision can be supported by the face rigidity of the thicker-walled the upper and lower faces 2Ac (3Ac, 17Ac) and 2Ad (3Ad, 17Ad). As a result, the amount of energy absorbed can be increased.

Variation of the Second Embodiment

Figure 15:
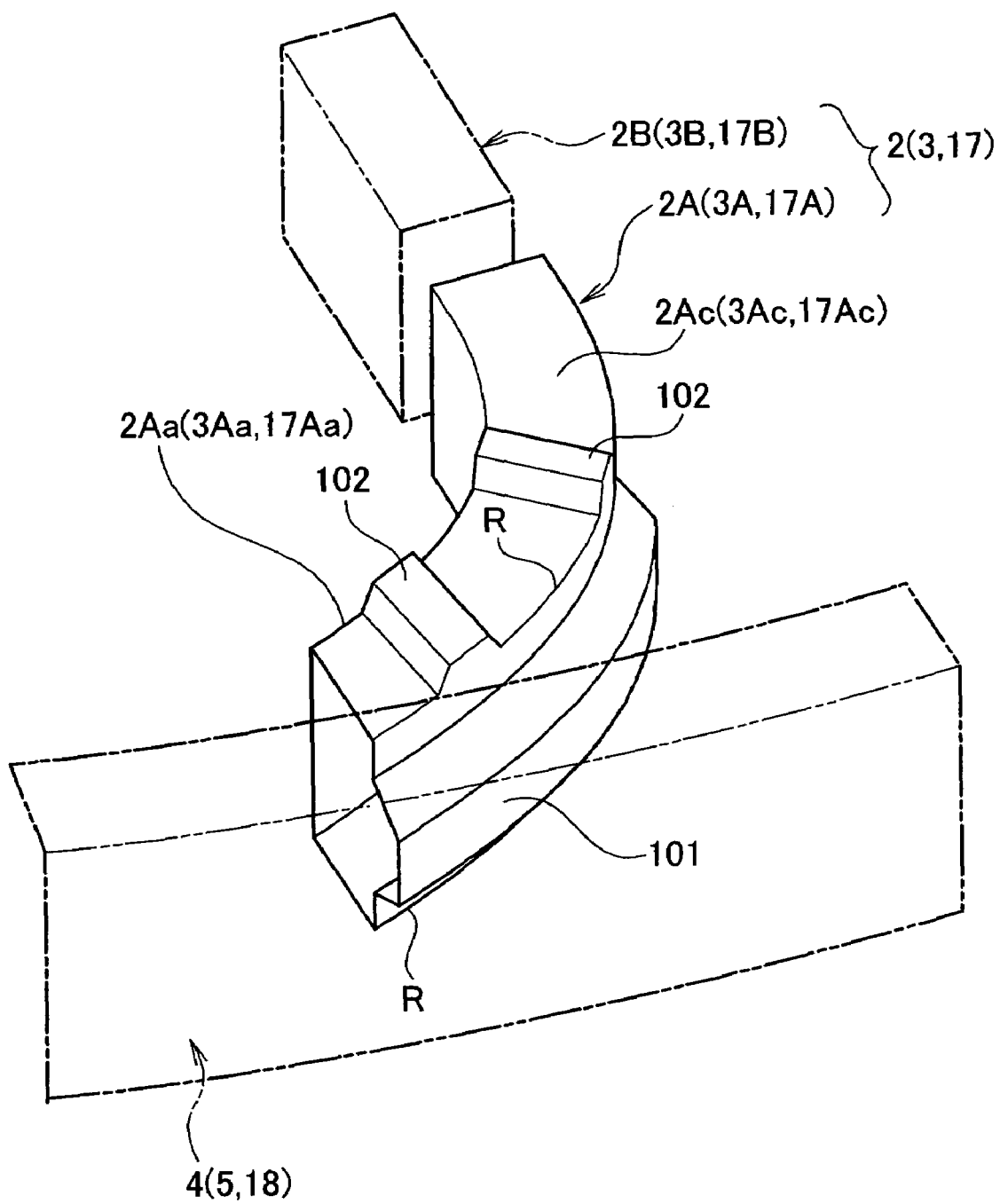
FIG. 15 is an exploded frontal perspective view of the curved part of a longitudinal frame member in accordance with a variation of the second embodiment of the present invention.

Referring now to FIG. 15, a portion of a vehicle body end structure in accordance with a variation of the second embodiment will now be explained. Basically, the vehicle body front end structure of this variation of the second embodiment is identical to the second embodiment, except for using a modified curved part 2A (3A, 17A) as explained below as explained below. The other constituent features are the same as in the first embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

FIG. 15 is an exploded frontal perspective view of the curved part 2A (3A, 17A) of the longitudinal frame member 2 (3 and 17). In this variation of the second embodiment, as shown in FIG. 15, the deformation control structure of the curved part 2A (3A, 17A) comprises one wide bead or ridge 101 provided on the outer face 2Ab (3Ab, 17Ab) and two wide beads or ridges 102 provided on each of the upper face 2Ac (3Ac, 17Ac) and the lower face 2Ad (3Ad, 17Ad). By adjusting the width and number of the beads 101 and 102 in this way, the face rigidity of the curved part 2A (3A, 17A) can be adjusted with excellent precision and, thus, the deformation mode of the curved part 2A (3A, 17A) can be controlled with excellent precision.

Also similarly to the second embodiment (see FIG. 14), in this variation the wall thicknesses of the upper and lower faces 2Ac (3Ac, 17Ac) and 2Ad (3Ad, 17Ad) are larger than the wall thicknesses of the inner face 2Aa (3Aa, 17Aa) and the outer face 2Ab (3Ab, 17Ab).

The separately formed curved part 2A (3A, 17A) and the main portion 2B (3B, 17B) can be welded together in the manner of the first embodiment (see FIG. 5) or connected together with end plates 26 and 28 in the manner of the third variation of the first embodiment (see FIG. 12).

Meanwhile, the curved part 2A (3A, 17A) and the transverse frame member 4 (5, 18) can be welded together through a bracket 21 in the manner of the first embodiment (see FIG. 7) or fastened together with stud bolts 23 and nuts 25 in the manner of the second variation of the first embodiment (see FIG. 11).

Third Embodiment

Figure 16:
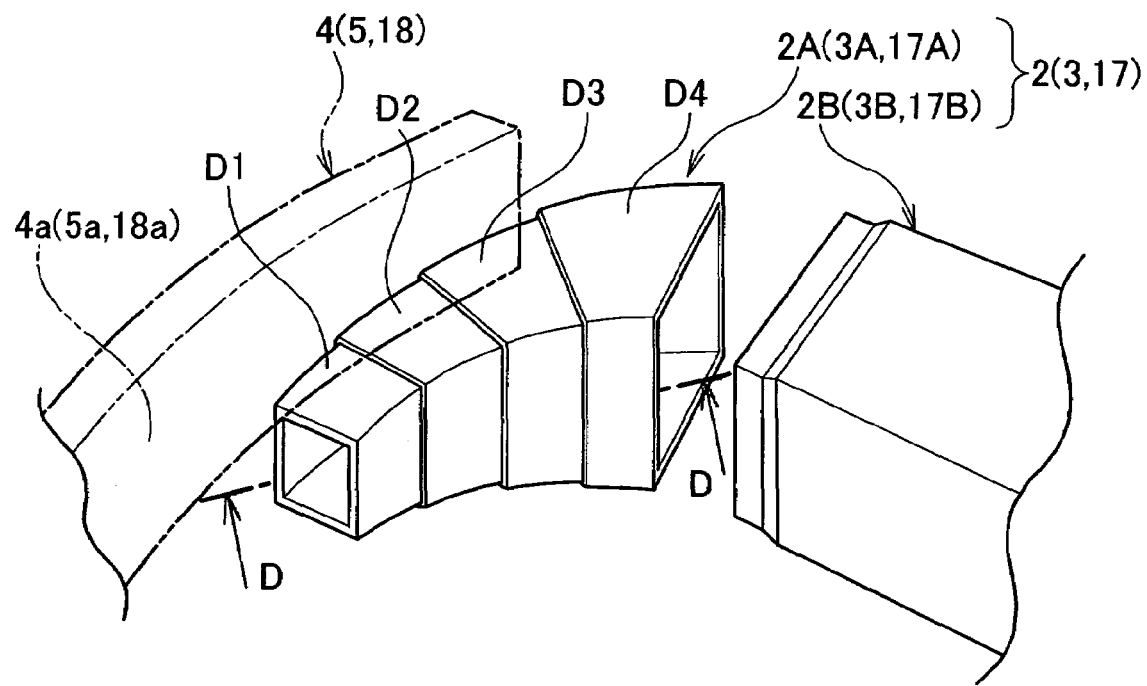
FIG. 16 is an exploded rear perspective view of a curved part of a longitudinal frame member in accordance with a third embodiment of the present invention.
Figure 17:
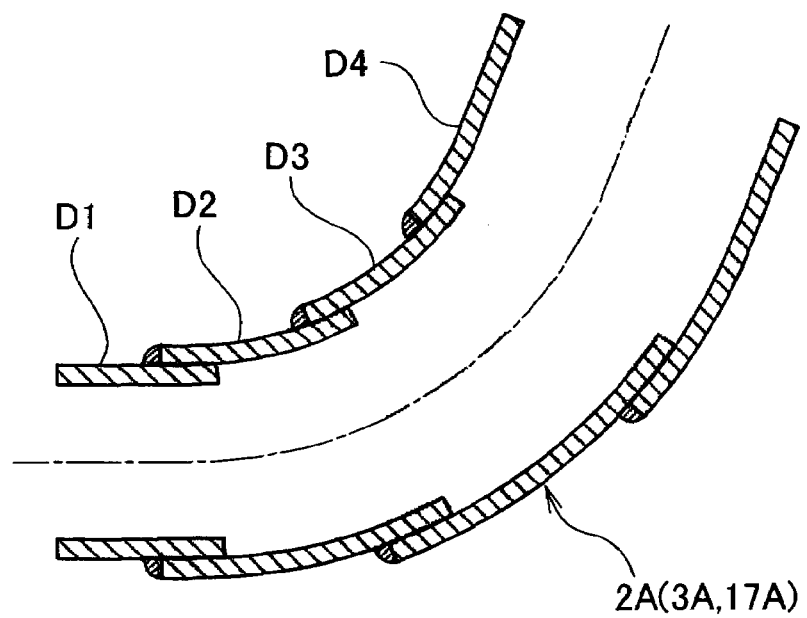
FIG. 17 is a cross sectional view of the curved part of the longitudinal frame member as taken along the section line D—D of FIG. 16 in accordance with the third embodiment of the present invention.

Referring now to FIGS. 16 and 17, a portion of a vehicle body end structure in accordance with a third embodiment will now be explained. Basically, the vehicle body front end structure of this third embodiment is identical to the first embodiment, except for using a modified curved part 2A (3A, 17A) as explained below. The other constituent features are the same as in the first embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

FIG. 16 shows an exploded rear perspective view of the curved part 2A (3A, 17A) of the longitudinal frame longitudinal frame member 2 (3 and 17), while FIG. 17 shows a cross sectional view taken of the curved part 2A (3A, 17A) as seen along the section line D—D of FIG. 16. In the vehicle body end structure of the third embodiment, as shown in FIG. 16, the deformation control structures are constituted by making the curved part 2A (3A, 17A) of each longitudinal frame member 2 (3 and 17) out of a plurality of section members D1 to D4 arranged in the lengthwise direction of the curved part 2A (3A, 17A) and connected together in such a manner as to achieve a sectioned structure. The girth of each section member D1 to D4 is different so that the cross sectional coefficient of each section member D1 to D4 is different.

The curved part 2A (3A, 17A) is made to have a rectangular cross sectional shape that generally matches the cross sectional shape of the main portion 2B (3B, 17B) of the longitudinal frame member 2 (3, 17) and to taper toward a smaller girth from the rear end to the front end thereof.

As shown in FIG. 17, the section members D1 to D4 (four in this embodiment) are connected together by fitting the rear end of each forward member into the forward opening of each rearward member (e.g., rear end of D1 fits into opening of D2, rear end of D2 fits into opening of D3, etc.) such that a close fit is achieved and securing each connection with a weld W. It is preferred that a sealant or adhesive be used on the fitted portions (i.e., between the outside surface of the forward member and the interior surfaces of the rearward member) in order to increase the strength of the joints between the section members D1 to D4.

Here again, in the third embodiment the curved part 2A (3A, 17A) and the main portion 2B (3B, 17B) can be connected together in the manner of the first embodiment shown in FIG. 5 by fitting the rear open end of the curved part 2A (3A, 17A) over the main portion 2B (3B, 17B) and welding the two portions together or in the manner of the third variation of the first embodiment shown in FIG. 12 by using nuts 29 to fasten together end plates 26 and 28 that are fixed to the rear end of the curved part 2A (3A, 17A) and the front end of the main portion 2B (3B, 17B), respectively.

Meanwhile, the curved part 2A (3A, 17A) can be connected to the transverse frame member 4 (5, 18) in the manner of the first embodiment as shown in FIG. 7 by fitting the plug part 21B of a bracket 21 fixed to the rear face of the transverse frame member 4 (5, 18) into the open end of the curved part 2A (3A, 17A) and welding the two together or in the manner of the second variation of the first embodiment as shown in FIG. 11 by inserting stud bolts 23 provided on the rear face 4a (5a, 18a) of the transverse frame member 4 (5, 18) through bolt holes 24 provided in the curved part 2A (3A, 17A) and securing the bolts 23 with nuts 25.

When a vehicle body end structure in accordance with the third embodiment undergoes a front collision, the section members D1 to D4 of the curved part 2A (3A, 17A) deform in sequence from front to rear because their cross sectional areas differ in such a manner that their cross sectional coefficients increase from front to rear. As a result, the vehicle body end structure of the third embodiment achieves a stable deformation mode and collision reaction force and exhibits substantially the same operational effects as the first embodiment.

Since the section members D1 to D4 are fitted into each other and welded together, the portions where the section members fit together are high in strength and thus can exhibit high reaction forces. Furthermore, this structure suppresses the tendency for acute bending of the members to occur due to localized stress concentration in the curved part 2A (3A, 17A).

Variation of the Third Embodiment

Figure 18:
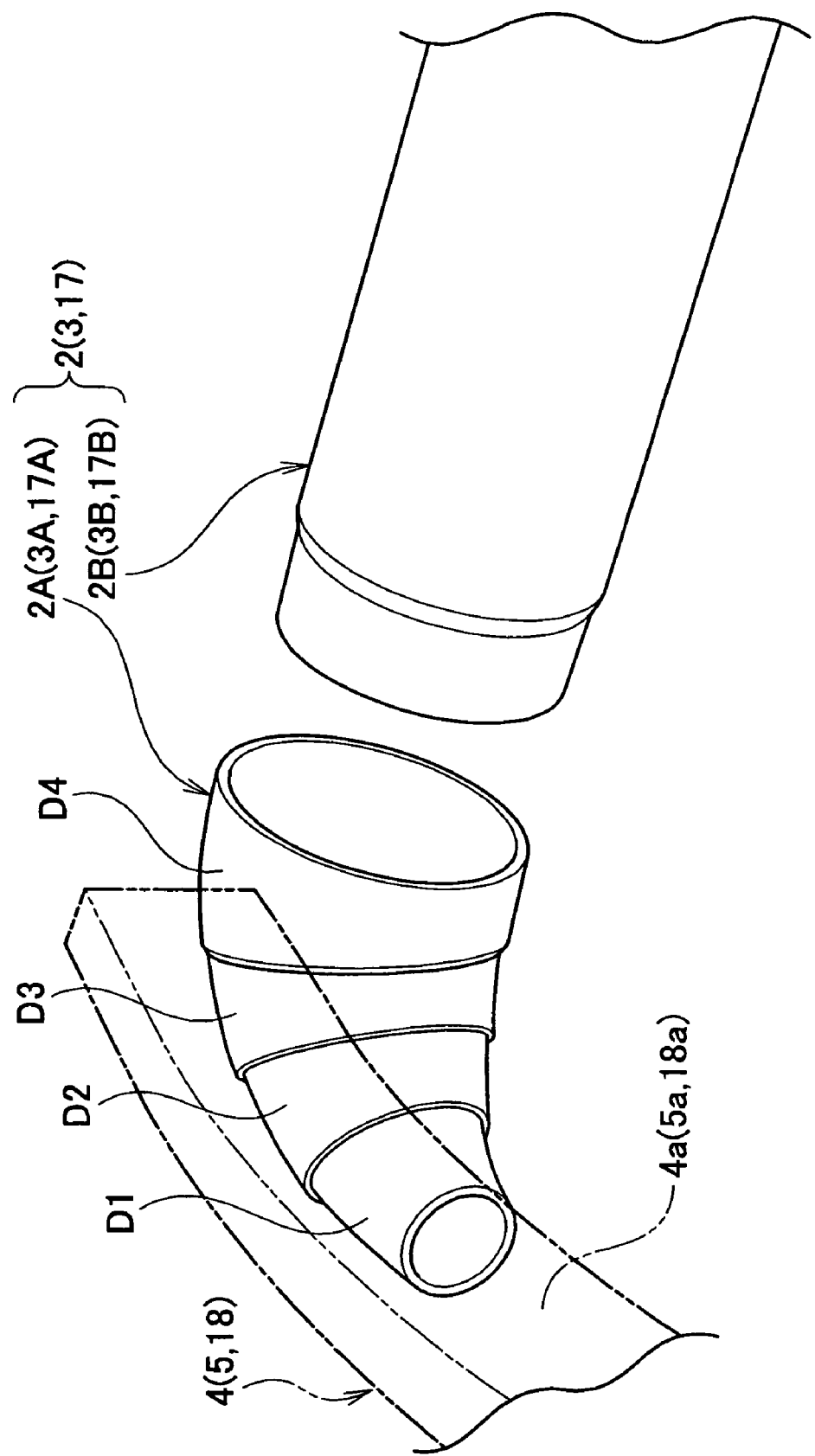
FIG. 18 is an exploded frontal perspective view of a curved part of a longitudinal frame member in accordance with a variation of the third embodiment of the present invention.

Referring now to FIG. 18, a portion of a vehicle body end structure in accordance with a variation of the third embodiment will now be explained. Basically, the vehicle body front end structure of this variation of the third embodiment is identical to the third embodiment, except for using a modified curved part 2A (3A, 17A) as explained below as explained below. The other constituent features are the same as in the third embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

FIG. 18 is an exploded frontal perspective view of the curved part 2A (3A, 17A) of the longitudinal frame member 2 (3 and 17). In this variation of the third embodiment, as shown in FIG. 18, the cross sectional shape of the main portion 2B (3B, 17B) of the longitudinal frame member 2 (3, 17) is generally circular. The cross sectional shape of the curved part 2A (3A, 17A) is also generally circular and tapers from end to end.

Similarly to the third embodiment, in this variation the curved part 2A (3A, 17A) is made out of a plurality of section members D1 to D4 arranged in the lengthwise direction of the curved part 2A (3A, 17A) and connected together in such a manner as to achieve a sectioned structure. The cross sectional coefficient of each section member D1 to D4 is different. The section members D1 to D4 are connected together by fitting the rear end of each forward member into the forward opening of each rearward member (e.g., rear end of D1 fits into opening of D2, rear end of D2 fits into opening of D3, etc.) such that a close fit is achieved and securing each connection with a weld W. In this way, this variation achieves substantially the same operational effects as the third embodiment.

The separately formed curved part 2A (3A, 17A) and main portion 2B (3B, 17B) can be welded together in the manner of the first embodiment (see FIG. 5) or connected together with end plates 26, 28 in the manner of the third variation of the first embodiment (see FIG. 12). Meanwhile, the curved part 2A (3A, 17A) and the transverse frame member 4 (5, 18) can be welded together through a bracket 21 in the manner of the first embodiment (see FIG. 7) or fastened together with stud bolts 23 and nuts 25 in the manner of the second variation of the first embodiment (see FIG. 11).

Fourth Embodiment

Referring now to FIGS. 19 to 25, a portion of a vehicle body end structure in accordance with a fourth embodiment will now be explained. Basically, the vehicle body front end structure of this fourth embodiment is identical to the first embodiment, except for using modified curved parts 2A', 3A' and 17A' as explained below. The other constituent features are the same as in the first embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

Figure 19:
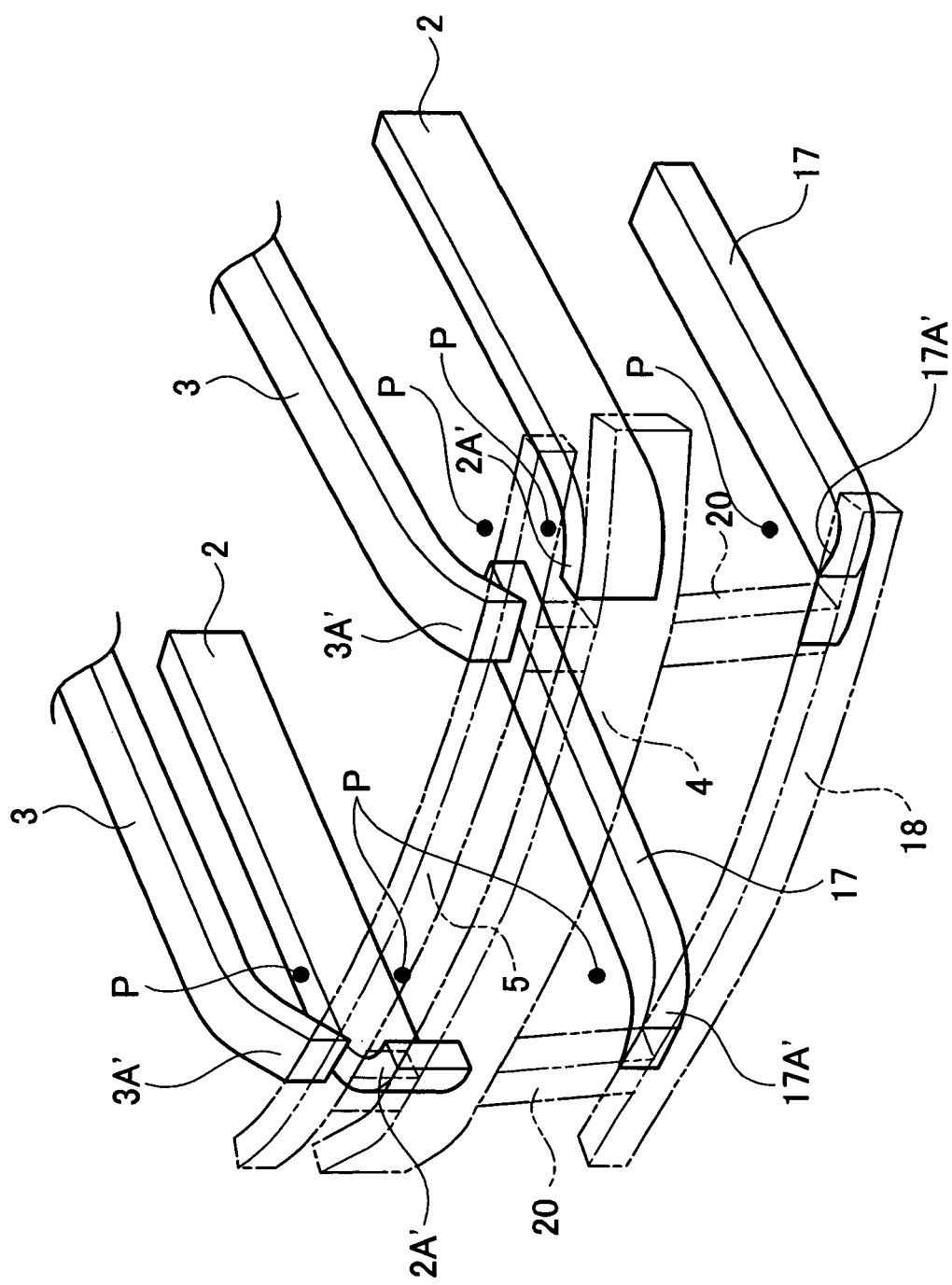
FIG. 19 is a perspective view of a vehicle body end structure in accordance with a fourth embodiment of the present invention.
Figure 20:
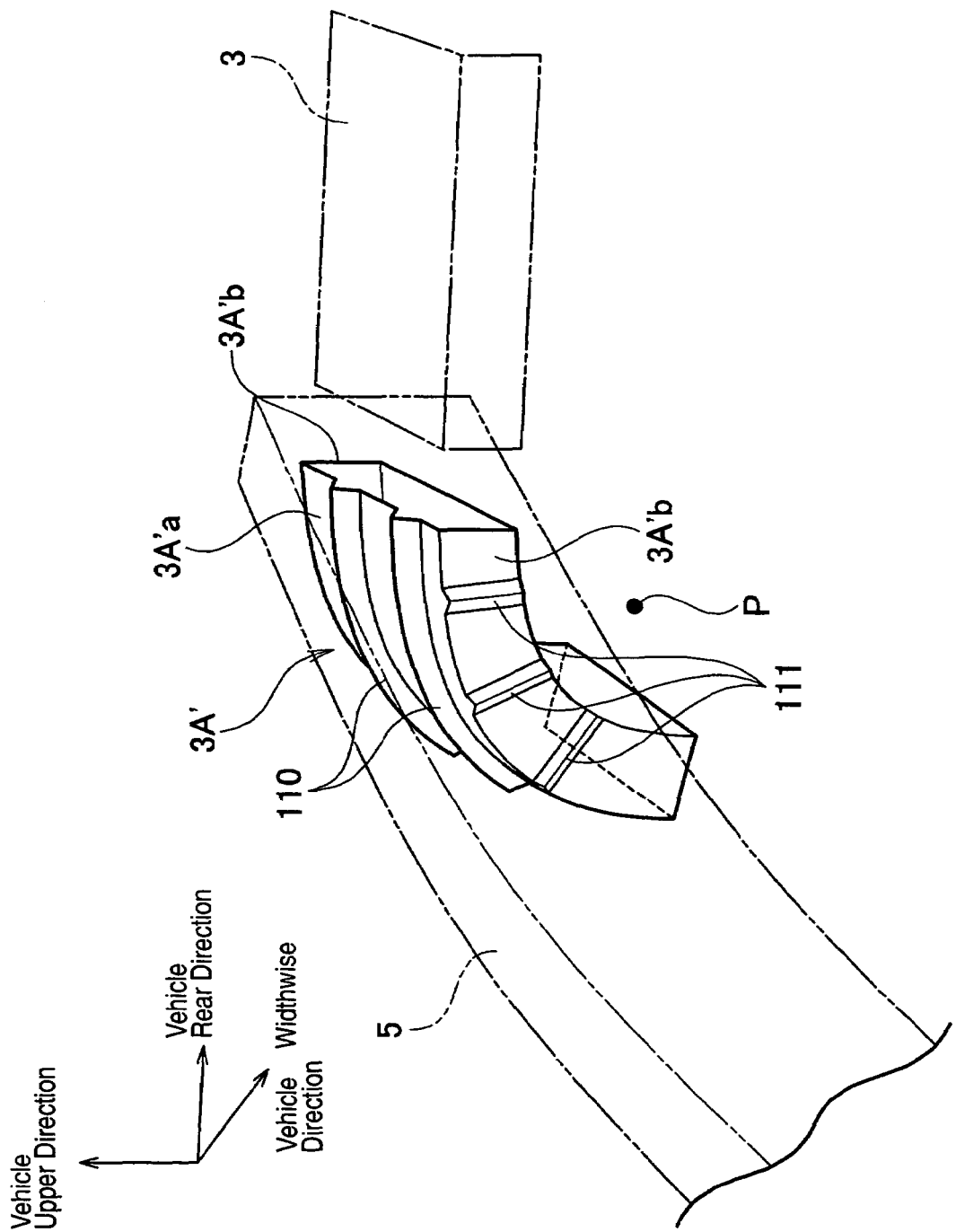
FIG. 20 is a perspective view of a curved part of one of the hood ledge members in accordance with the fourth embodiment of the present invention.
Figure 21:
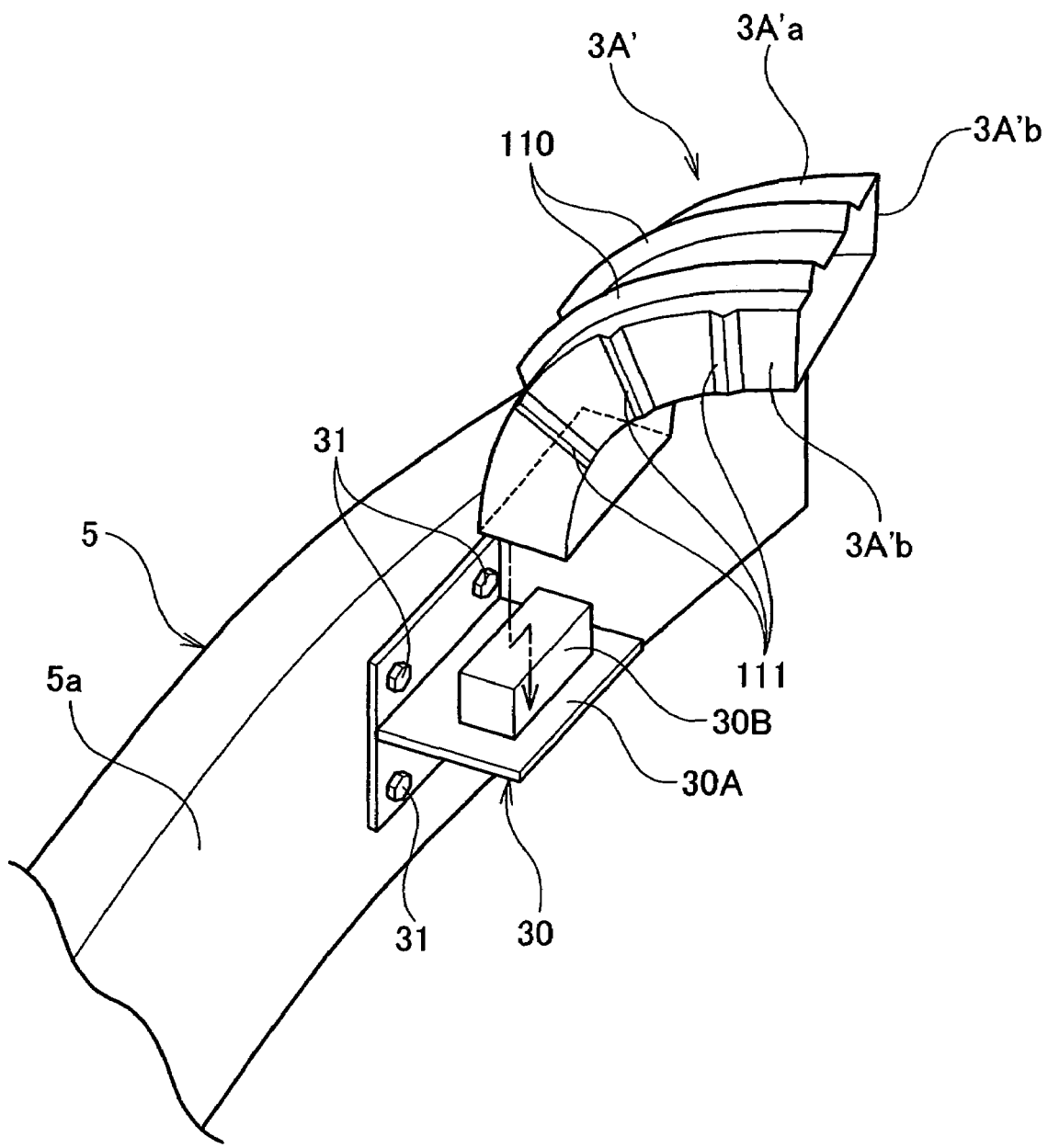
FIG. 21 is a perspective view of a mounting structure between the curved part of the hood ledge member and the upper cross member in accordance with the fourth embodiment of the present invention.
Figure 22:
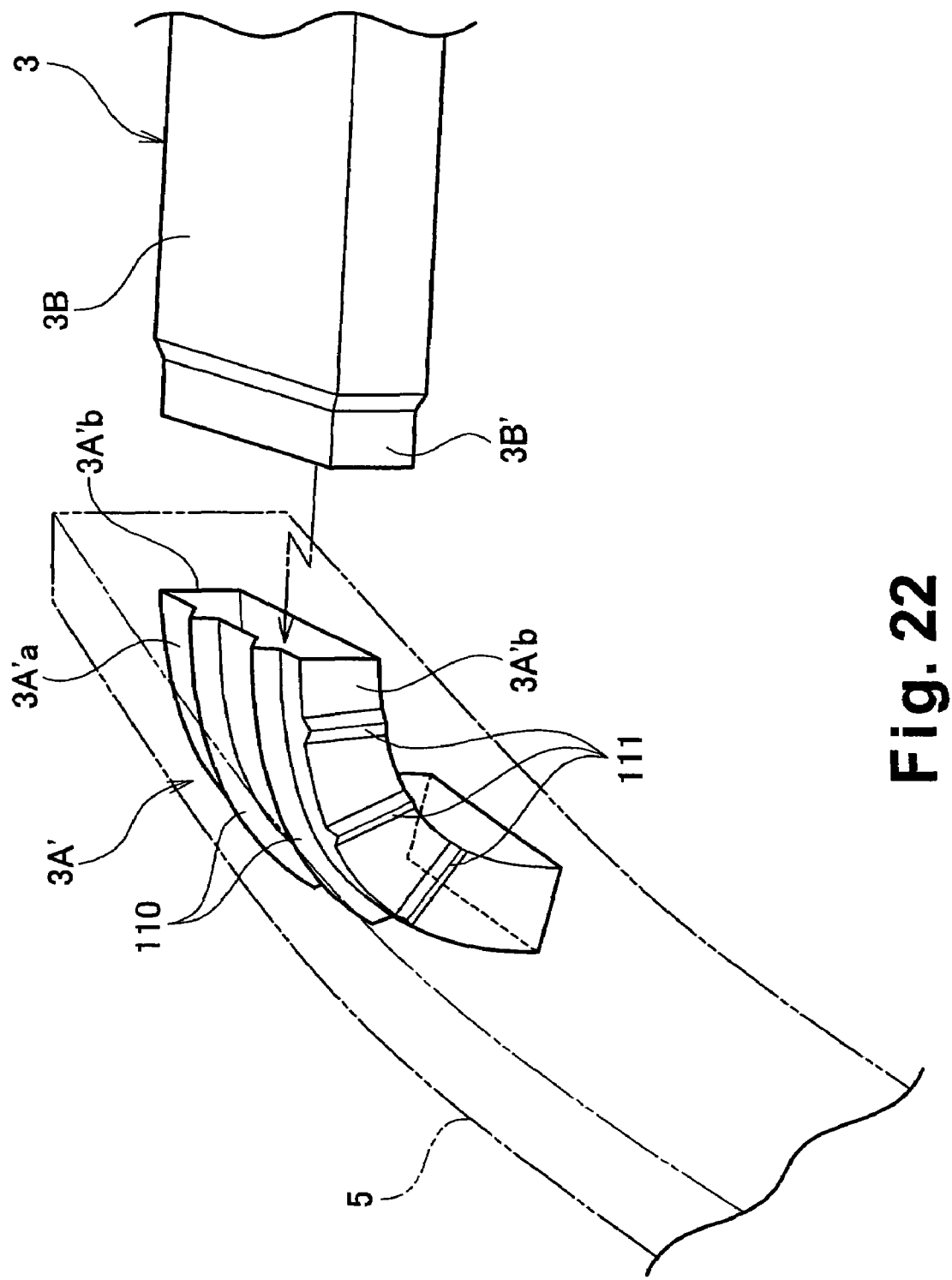
FIG. 22 is a perspective view of a mounting structure between a hood ledge member and the curved part thereof in accordance with the fourth embodiment of the present invention.
Figure 23:
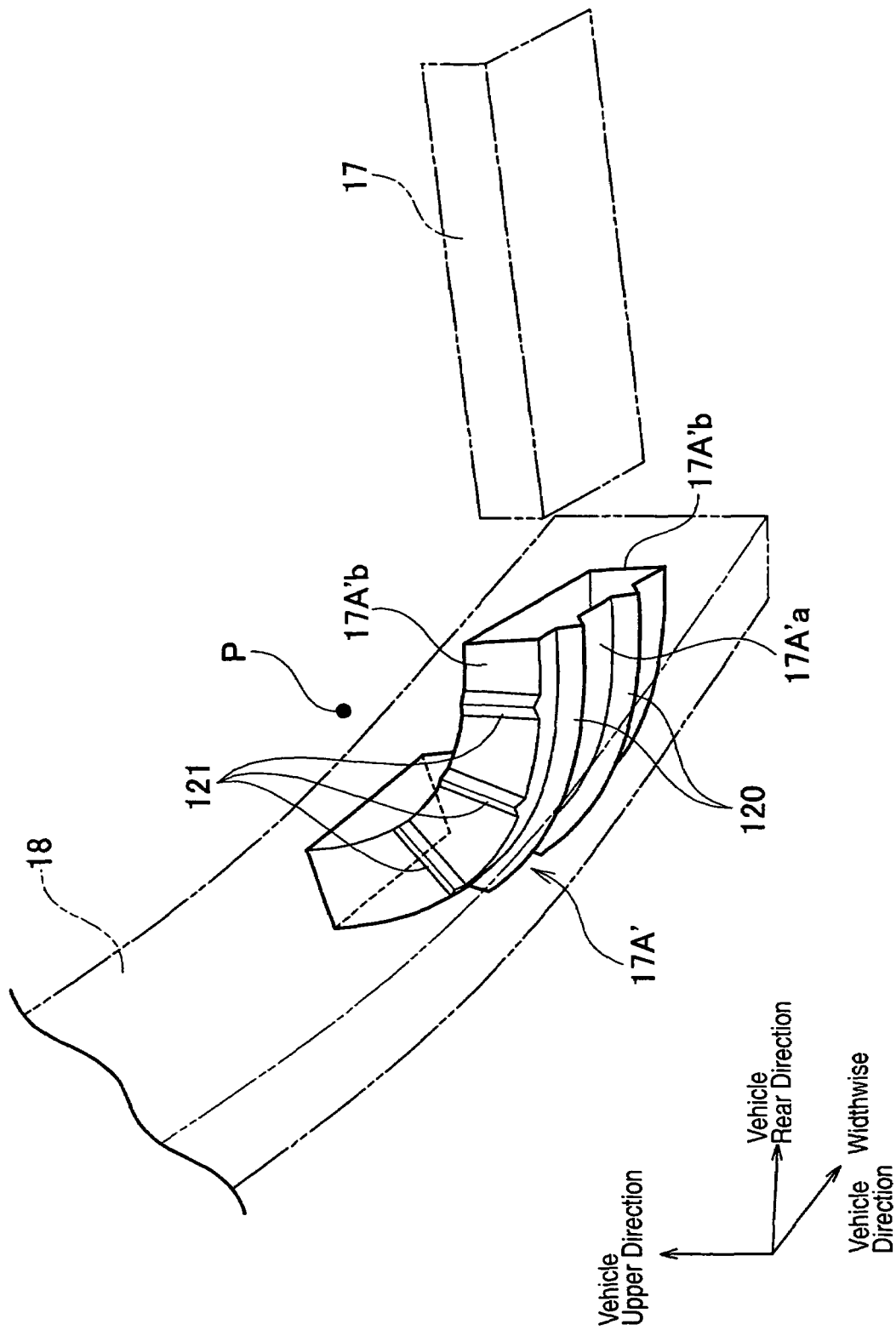
FIG. 23 is a bottom perspective view of the curved part of a side frame in accordance with the fourth embodiment of the present invention.
Figure 24:
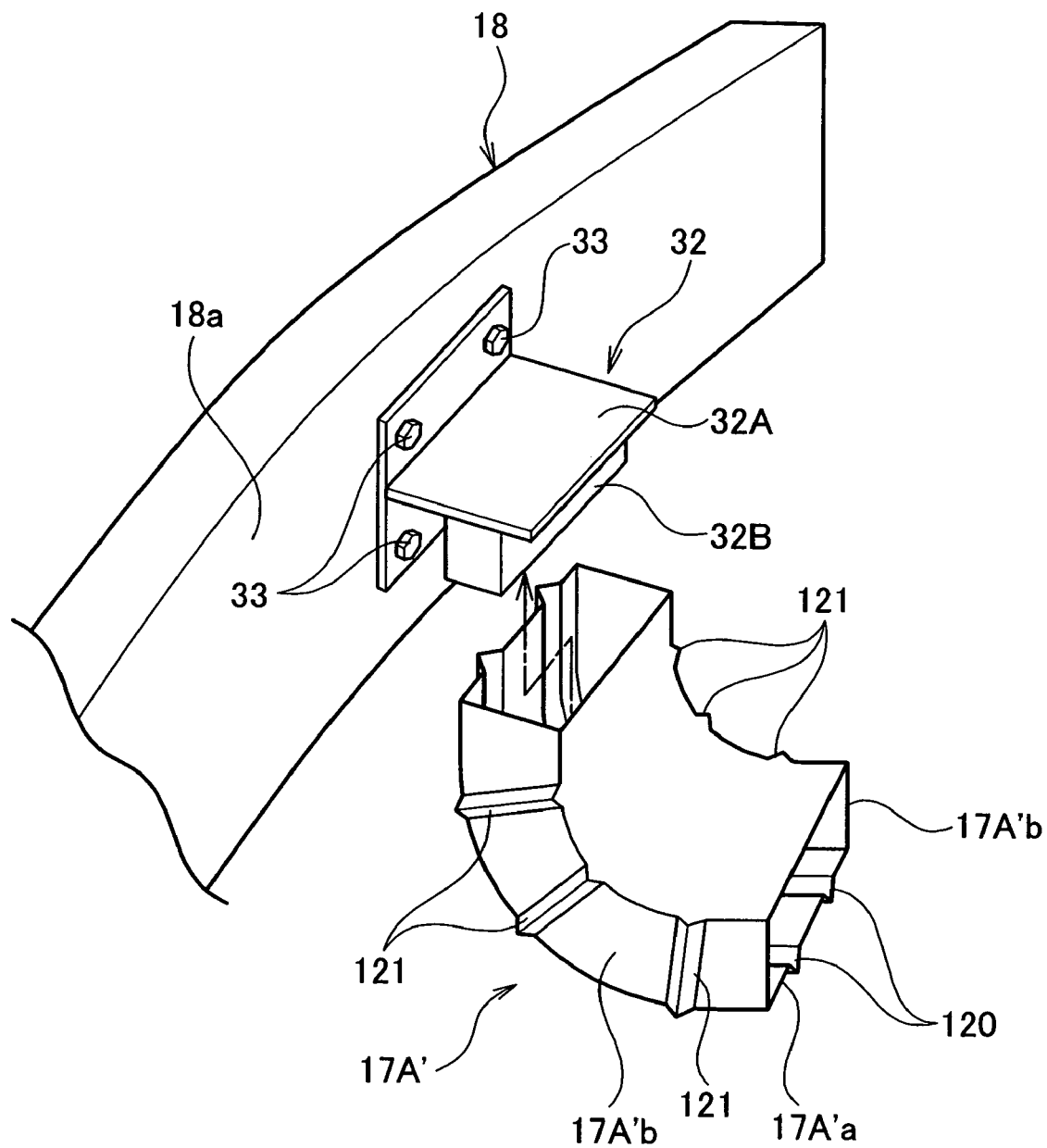
FIG. 24 is a perspective view of a mounting structure between the curved part of a side frame and the lower cross member in accordance with the fourth embodiment of the present invention.
Figure 25:
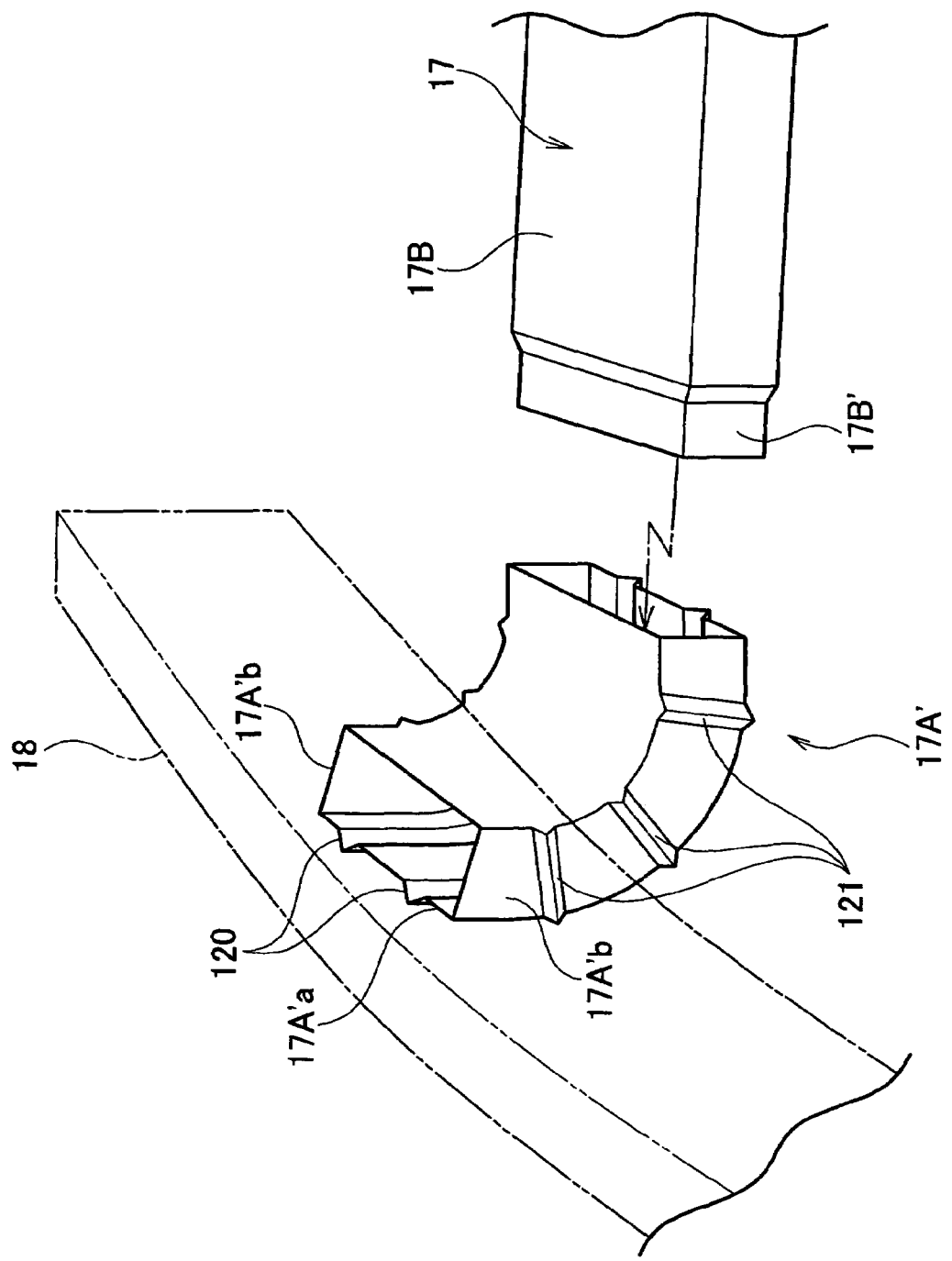
FIG. 25 is a perspective view of a mounting structure between a side frame and the curved part thereof in accordance with the fourth embodiment of the present invention.

FIG. 19 is a perspective view of the frame structure of the front portion of the vehicle body. FIG. 20 is a perspective view of the curved part 3A' of a hood ledge member 3 (longitudinal frame member). FIG. 21 is a perspective view of a mounting structure between the curved part 3A' of the hood ledge member 3 and the upper cross member 5. FIG. 22 is a perspective view of a mounting structure between the hood ledge member 3 and the curved part 3A'. FIG. 23 is a bottom perspective view of the curved part 17A' of the side frame 17. FIG. 24 is a perspective view of a mounting structure between the curved part 17A' of the side frame 17 and the lower cross member 18. FIG. 25 is a perspective view of a mounting structure between the side frame 17 and the curved part 17A'.

As shown in FIG. 19, the vehicle body end structure of the fourth embodiment has a pair of front side members 2, a pair of hood ledge members 3, and a pair of side frames 17 that function as longitudinal frame members that are arranged vertically above and below each other, similarly to the first embodiment. The front ends of each pair of longitudinal members are connected to the center cross member 4, the upper cross member 5, or the lower cross member 18, respectively, the respective cross members spanning across said front ends. Also, in a similar manner to the previous embodiments, curved parts 2A', 3A' and 17A' are provided at the portions where the longitudinal members connect to the cross members.

The main difference between this embodiment and the previous embodiments is that each of the curved parts 2A', 3A' and 17A' are curved in a different directions. More specifically, the curved parts 2A' at the front ends of the front side members 2 (sometimes called "middle curved parts 2A'" for the purposes of describing this embodiment) are curved about centers of curvature located on the transversely inward sides of the curved parts 2A'. The curved parts 3A' at the front ends of hood ledge members 3 (sometimes called "upper curved parts 3A'" for the purposes of describing this embodiment) are curved about centers of curvature P located below the curved parts 3A' such that they curve downward toward the front of the vehicle as shown in FIG. 20. The curved parts 17A' at the front ends of the side frames 17 (sometimes called "lower curved parts 17A'" for the purposes of describing this embodiment) are curved about centers of curvature P located above the curved parts 17A' such that they curve upward toward the front of the vehicle as shown in FIG. 23.

Similarly to the first and second embodiments, each of the middle, upper, and lower curved parts 2A', 3A' and 17A' has the form of a pipe having a rectangular cross section. More particularly, as shown in FIGS. 20 and 23, in this embodiment the upper and lower curved parts 3A' and 17A' are provided with beads 110 and 120 on the outer faces 3A'a and 17A'a thereof, which are on the opposite sides thereof as the centers of curvature P, and with beads 111 and 121 on the left and right faces 3Ab and 17A'b thereof, which are located on both sides of the outer faces 3A'a and 17A'a. The beads 110, 120, 111 and 121 function as deformation control structure.

In this embodiment, two beads 110 and 120 are provided on each outer face 3A'a and 17A'a and three beads 111 and 121 are provided on each left and right face 3A'b and 17Ab.

The middle curved parts 2A' are configured as described in the first embodiment or the second embodiment and can be provided with deformation control structure comprising cut-out notches 100, groove-like notches 100a, or beads 101 and 102. It is also possible to provide them with deformation control structure of still another structure.

The connections between the upper curved parts 3A' and the upper cross member 5 are accomplished by essentially arranging the T-shaped brackets 21 (see FIG. 7) used in the first embodiment in a horizontal orientation. As shown in FIG. 21, in this embodiment a T-shaped bracket 30 is fastened to the rear face 5a of the upper cross member 5 with bolts 31 and the open end of the upper curved part 3A' is fitted over a protruding plug part 30B provided on the upper surface of the bearing piece 30A of the bracket 30. The curved part 3A' is secured to the bearing piece 30A by welding around the edge of the tip end of the curved part 3A'.

The connections between the upper curved parts 3A' and the hood ledge members 3 are accomplished similarly to the fitted connections (see FIG. 5) of the first embodiment. As shown in FIG. 22, the front end of the main portion 3B of each hood ledge member is provided with a narrow part 3B' that is smaller by approximately the wall thickness of the main portion 3B. The rear end opening of the upper curved part 3A' is fitted over the narrow part 3B' and the upper curved part 3A' is secured to the main portion 3B with a weld applied around the edge of the tip end of the upper curved part 3A'.

The connections between the lower curved parts 17A' and the lower cross member 18 are accomplished by essentially turning the brackets 30 used for connecting the upper curved parts 3A' upside-down. As shown in FIG. 24, a T-shaped bracket 32 is fastened to the rear face 18a of the lower cross member 18 with bolts 33 and the open end of the lower curved part 17A' is fitted over a protruding plug part 32B provided on the lower surface of the bearing piece 32A of the bracket 32. The curved part 17A' is secured to the bearing piece 32A by welding around the edge of the tip end of the curved part 17A'.

The connections between the lower curved parts 17A' and the side frames 17 are accomplished similarly to the connections between the upper curved parts 3A' and the hood ledge members 3. As shown in FIG. 25, the front end of the main portion 17B of each side frame 17 is provided with a narrow part 17B' that is smaller by approximately the wall thickness of the main portion 17B. The rear end opening of the lower curved part 17A' is fitted over the narrow part 17B' and the lower curved part 17A' is secured to the main portion 17B with a weld applied around the edge of the tip end of the lower curved part 17A'.

Thus, in a vehicle body end structure in accordance with the fourth embodiment, the middle curved parts 2A' of the front side members 2, the upper curved parts 3A' of the hood ledge members 3, and the lower curved parts 17A' of the side frames 17 are curved in different directions, i.e., the directions in which curvature has been imparted thereto are different. As a result, depending on the collision direction, either the middle curved parts 2A', the upper curved parts 3A', or the lower curved parts 17A' will deform in an effective manner due to the input of the collision load, enabling the collision contact surface area to be increased.

Thus, collision energy absorption effect achieved by the bellows-like buckling deformation of the main portions 2B, 3B and 17B can be increased.

In short, the use of the curved parts 2A', 3A' and 17A' that are curved in different directions enables a wide range of collision directions to be accommodated and enables the collision energy to be absorbed in an efficient manner. Even when the overlap ratio with respect to the colliding object is small, the amount of collision energy absorbed can be greatly increased because the collision contact surface area increases over time in a stable manner.

Additionally, since the collision energy absorption efficiency is increased, deformation of the cabin can be suppressed and the collision performance can be improved will keeping the weight down.

Also, similarly to the previous embodiments, the fourth embodiment also features beads or another deformation control structure provided on the curved members 2A', 3A' and 17A'. As a result, the occurrence of stress concentration at one location of the curved parts 2A', 3A' and 17A' can be prevented and the curved parts 2A', 3A' and 17A' can be allowed to deform in a stable manner.

First Variation of the Fourth Embodiment

Figure 26:
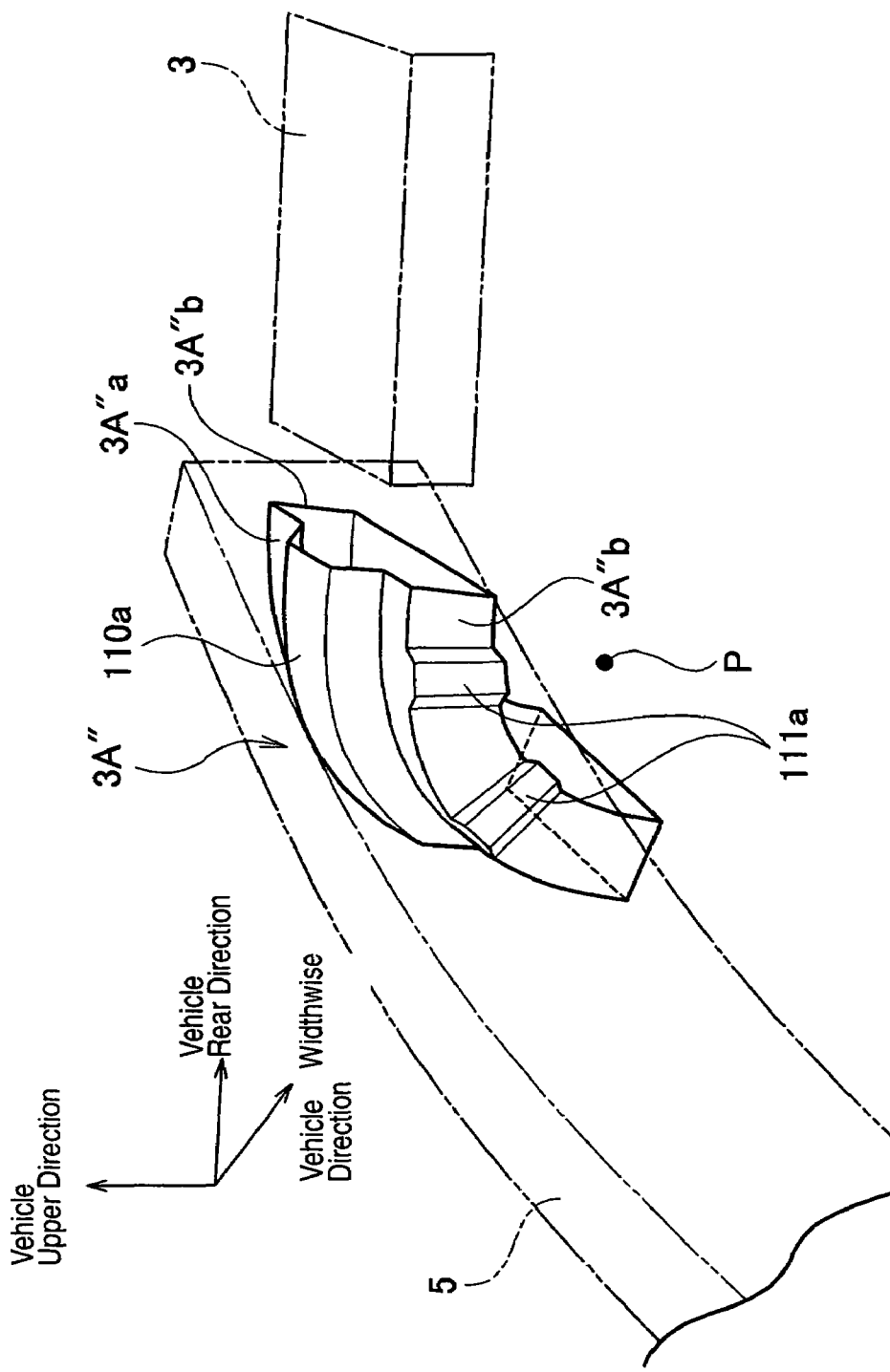
FIG. 26 is a perspective view of the curved part of a hood ledge member in accordance with a first variation of the fourth embodiment of the present invention.
Figure 27:
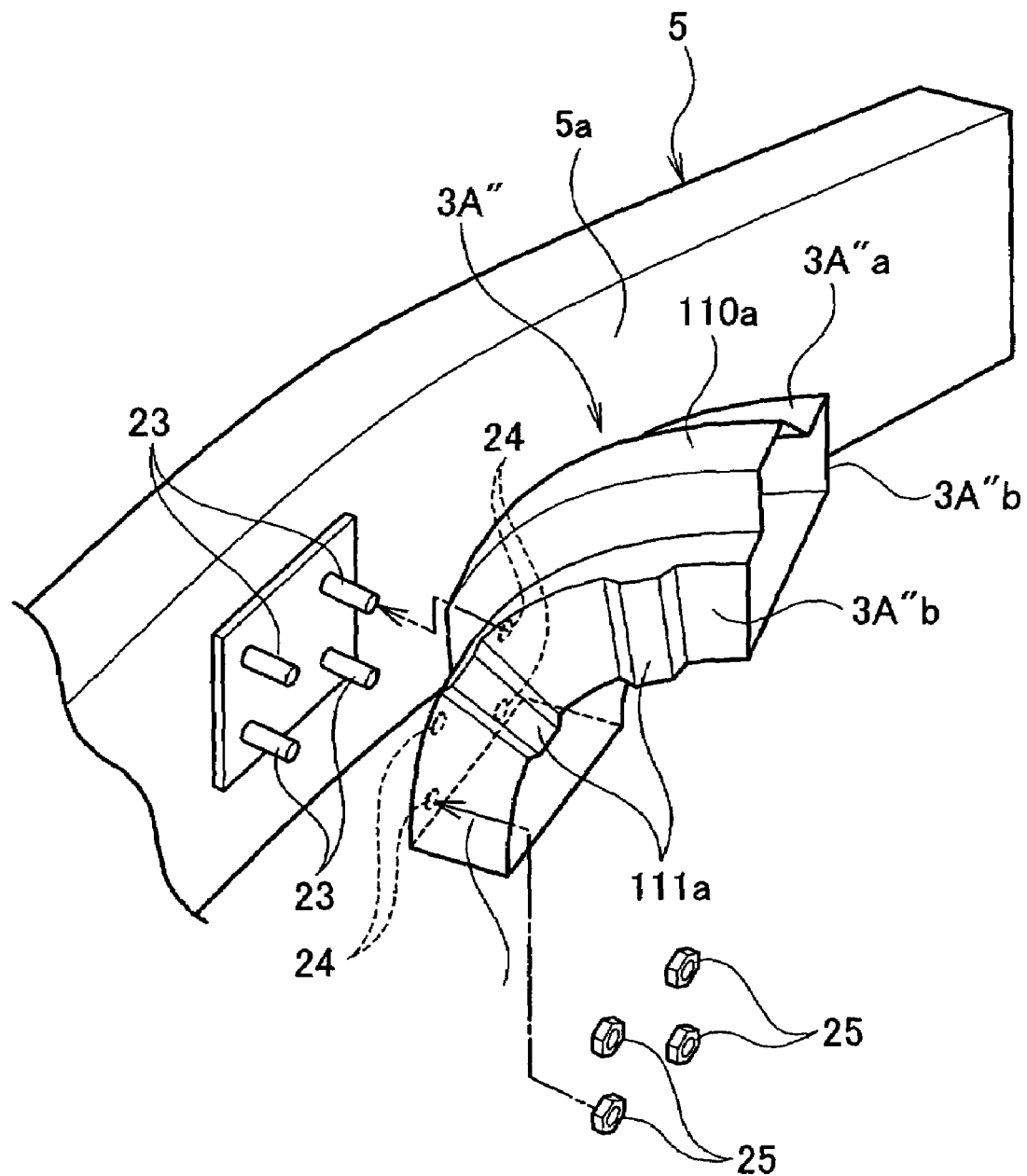
FIG. 27 is a perspective view of a mounting structure between the curved part of a hood ledge member and the upper cross member in accordance with the first variation of the fourth embodiment of the present invention.
Figure 28:
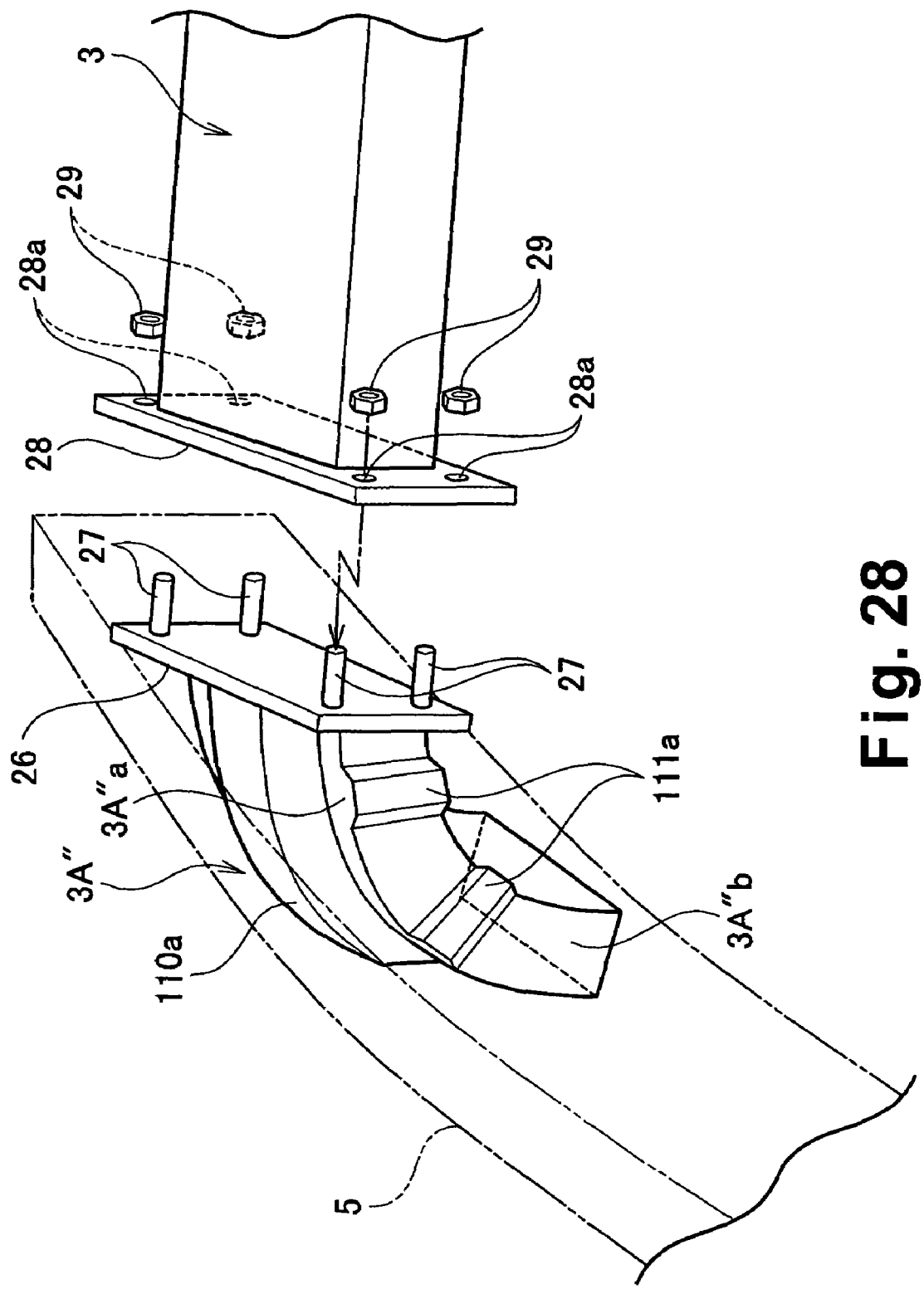
FIG. 28 is a perspective view of a mounting structure between a hood ledge member and the curved part thereof in accordance with the first variation of the fourth embodiment of the present invention.

Referring now to FIGS. 26 to 28, a portion of a vehicle body end structure in accordance with a first variation of the fourth embodiment will now be explained. Basically, the vehicle body front end structure of this first variation of the fourth embodiment is identical to the fourth embodiment, except for using a modified curved part 3A" as explained below. The other constituent features are the same as in the fourth embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

FIG. 26 is a perspective view of the curved part 3A" of the hood ledge member 3. FIG. 27 is a perspective view of a mounting structure between the curved part 3A" of the hood ledge member 3 and the upper cross member 5. FIG. 28 is a perspective view of a mounting structure between a hood ledge member 3 and the curved part 3A" thereof. As shown in FIG. 26, the upper curved part 3A" of the first variation of the fourth embodiment is provided with one bead or ridge 110a on the outer face 3A" and two beads or ridges 111a each on the left and right faces 3A"b, the beads 110a and 111a serving as deformation control structure.

The connections between the upper curved parts 3A" and the upper cross member 5 is accomplished similarly to the second variation of the first embodiment (see FIG. 11). As shown in FIG. 27, several stud bolts 23 are provided on the rear face 5a of the upper cross member 5 and several bolt holes 24 are provided in the portion of the outer face 3A" serving as the tip end part of each upper curved part 3A". The stud bolts 23 are passed through the bolt holes 24 and fastened with nuts 25.

The connection between the upper curved parts 3A" and the hood ledge members 3 are accomplished similarly to the third variation of the first embodiment (see FIG. 12). As shown in FIG. 28, an end plate 26 is provided with a plurality of stud bolts 27 and an end plate 28 provided with a plurality of bolt holes 28a. The end plate 26 is fixed to the rear end of the upper curved part 3A". The end plate 28 is fixed to the front end of the main portion 3B of the hood ledge member 3. The stud bolts 27 are passed through the bolts holes 28a and fastened with nuts 29 such that the end plates 26 and 28 are flat against each other.

Second Variation of the Fourth Embodiment

Figure 29:
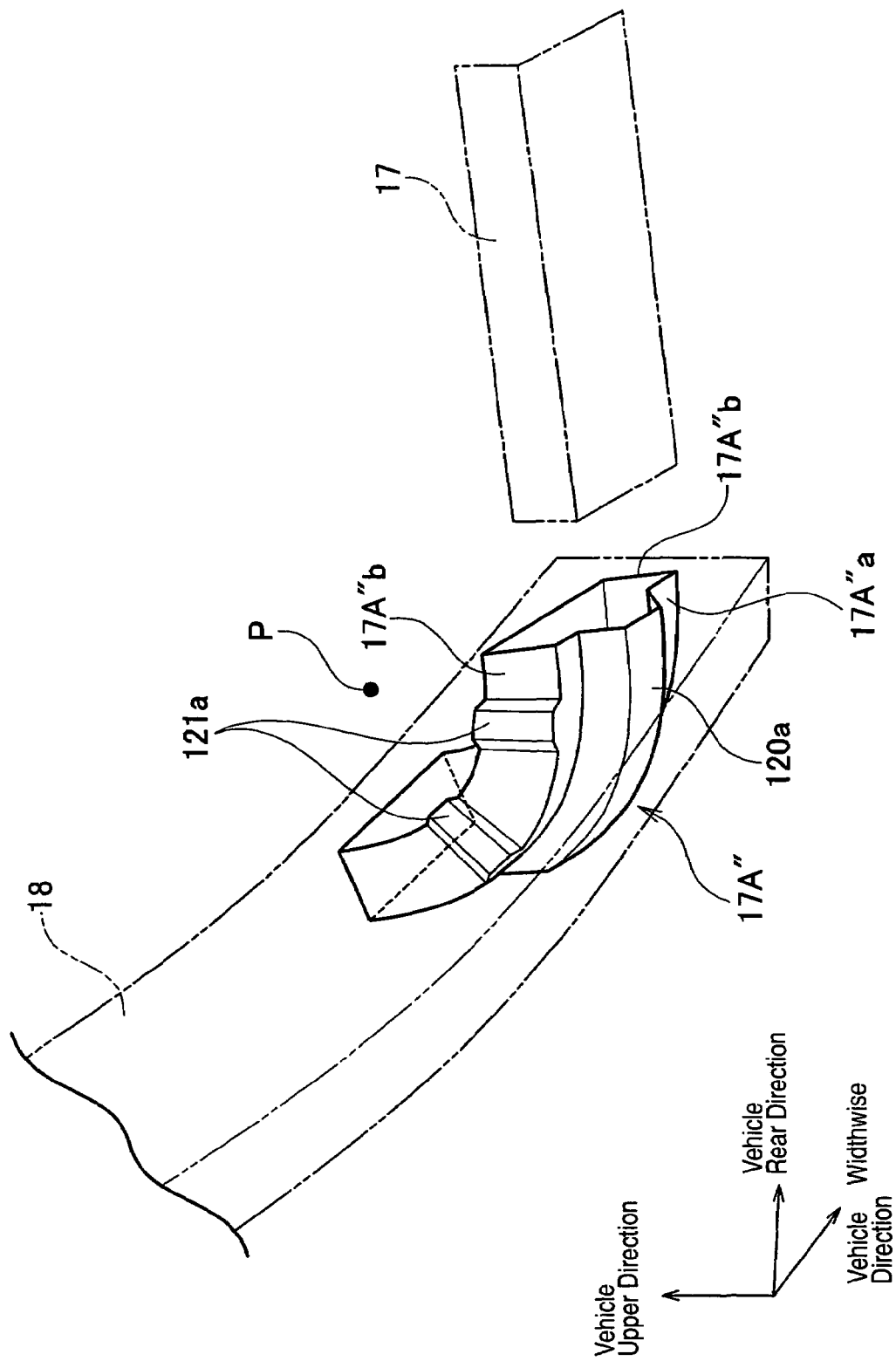
FIG. 29 is a bottom perspective view of the curved part of a side frame in accordance with a second variation of the fourth embodiment of the present invention.
Figure 30:
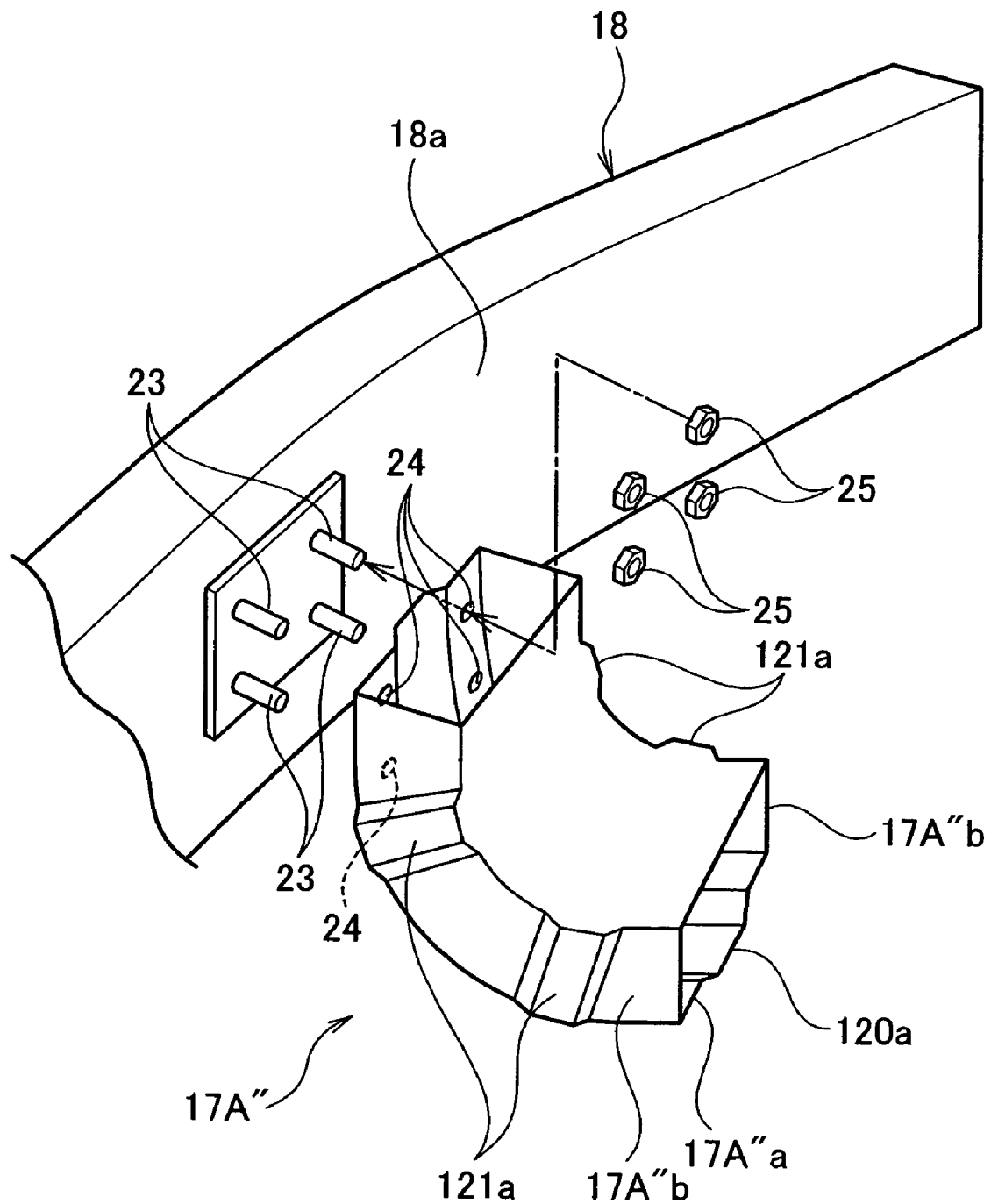
FIG. 30 is a perspective view of a mounting structure between the curved part of a side frame and the lower cross member in accordance with the second variation of the fourth embodiment of the present invention.
Figure 31:
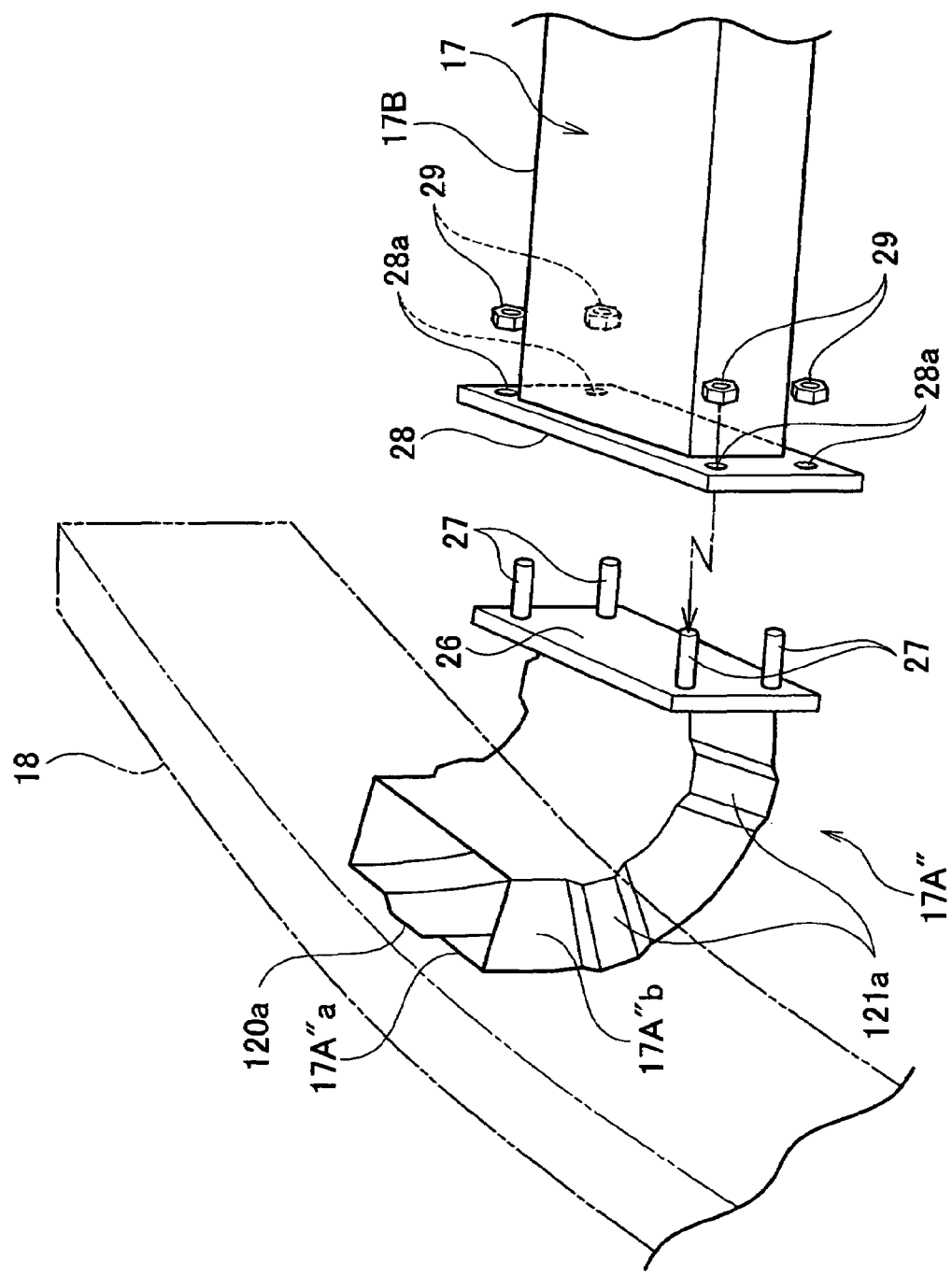
FIG. 31 is a perspective view of a mounting structure between a side frame and the curved part thereof in accordance with the second variation of the fourth embodiment of the present invention.

Referring now to FIGS. 29 to 31, a portion of a vehicle body end structure in accordance with a second variation of the fourth embodiment will now be explained. Basically, the vehicle body front end structure of this second variation of the fourth embodiment is identical to the fourth embodiment, except for using a modified curved part 17A" as explained below. The other constituent features are the same as in the fourth embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

FIG. 29 is a bottom perspective view of the curved part 17A" of the side frame 17. FIG. 30 is a perspective view of a mounting structure between the curved part 17A" of the side frame 17 and the lower cross member 18. FIG. 31 is a perspective view of a mounting structure between the side frame 17 and the curved part 17A". As shown in FIG. 29, the lower curved part 17A" of the second variation of the fourth embodiment is provided with one bead or ridge 120a on the outer face 17A" and two beads or ridges 121a each on the left and right faces 17A"b, the beads serving as deformation control structures.

The connections between the lower curved parts 17A" and the lower cross member 18 is accomplished similarly to the first variation (see FIG. 27). As shown in FIG. 30, several stud bolts 23 are provided on the rear face 18a of the lower cross member 18 and several bolt holes 24 are provided in the portion of the outer face 17A"a serving as the tip end part of the lower curved part 17A". The stud bolts 23 are passed through the bolt holes 24 and fastened with nuts 25.

The connection between the lower curved parts 17A" and the side frames 17 are accomplished similarly to the first variation (see FIG. 28). As shown in FIG. 31, an end plate 26 is provided with a plurality of stud bolts 27 and an end plate 28 provided with a plurality of bolt holes 28a. The end plate 26 is fixed to the rear end of the lower curved part 17A". The end plate 28 is fixed to the front end of the main portion 17B of the side member 17. The stud bolts 27 are passed through the bolts holes 28a and fastened with nuts 29 such that the end plates 26 and 28 are flat against each other.

Fifth Embodiment

Referring now to FIGS. 32 to 35, a portion of a vehicle body end structure in accordance with a fifth embodiment will now be explained. Basically, the vehicle body front end structure of this fifth embodiment is identical to the first embodiment, except that the upper frame structure has been eliminated and modified curved parts 2A" and 17Ax are used as explained below. The other constituent features are the same as in the first embodiment. In view of the similarity between the prior embodiments and this embodiment, the parts of this embodiment that are identical to the parts of the prior embodiments will be given the same reference numerals as the parts of the prior embodiments. Thus, the descriptions of parts that are identical to the parts previously described may be omitted for the sake of brevity.

Figure 32:
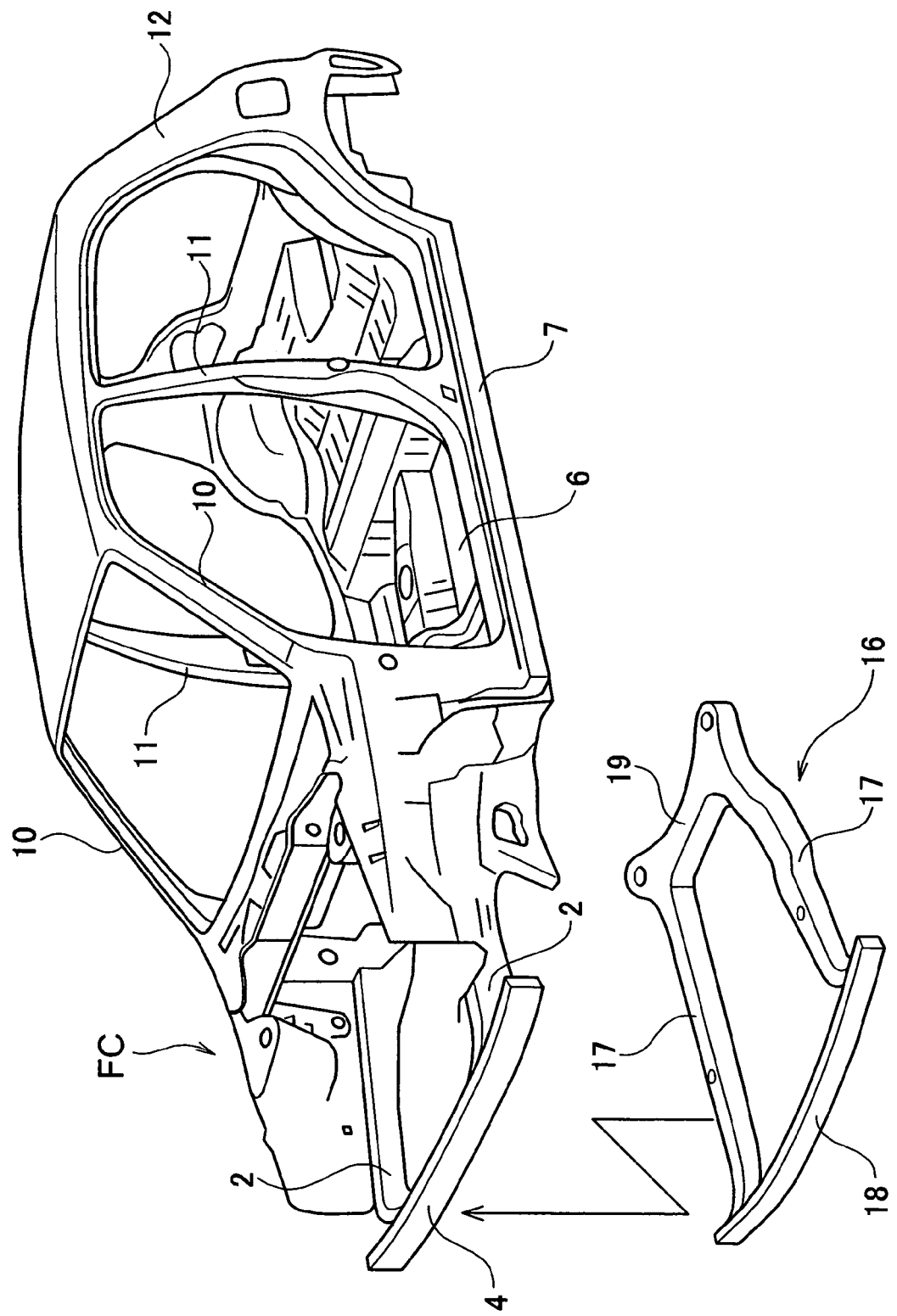
FIG. 32 is a perspective view of a vehicle body showing a vehicle body frame structure of an automobile having a vehicle body front end structure in accordance with a fifth embodiment of the present invention.
Figure 33:
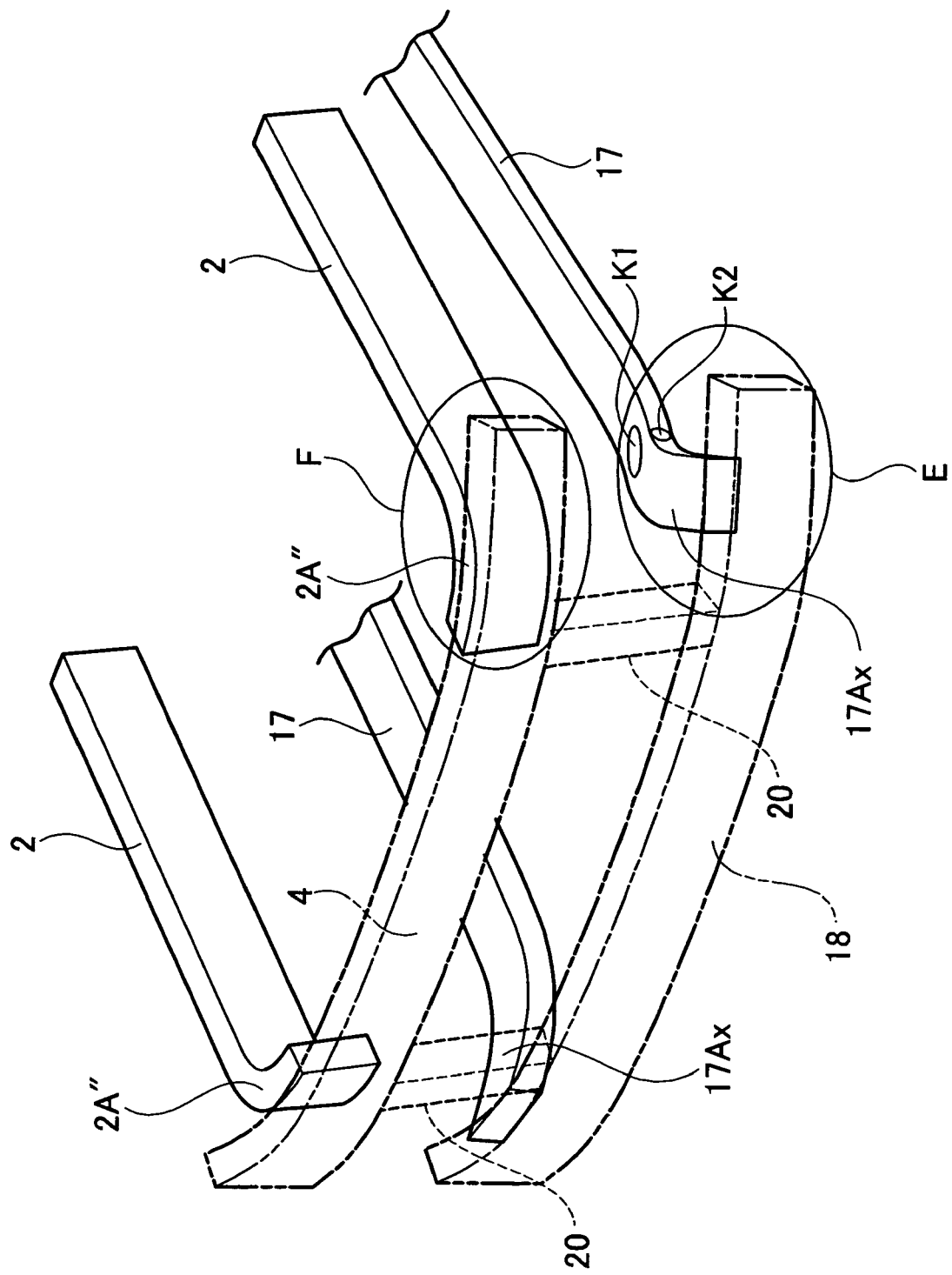
FIG. 33 is a perspective view showing key features of a vehicle body end structure in accordance with the fifth embodiment of the present invention.
Figure 34:
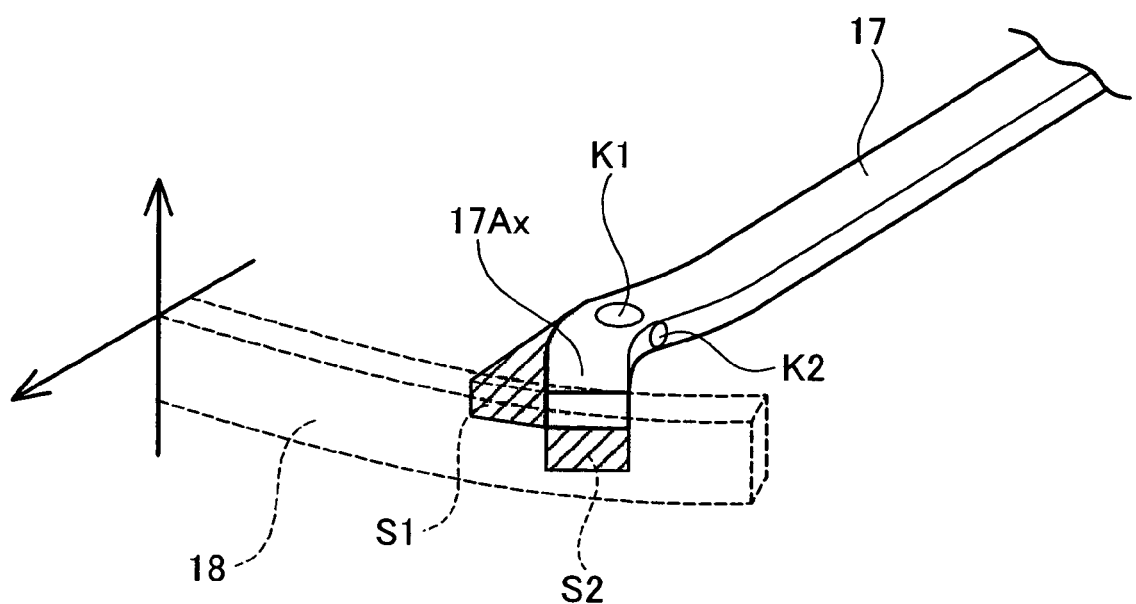
FIG. 34 is a perspective view of the curved part of one end of the longitudinal frame member and one end of the transverse frame member showing the details of the region E of FIG. 33.
Figure 35A:
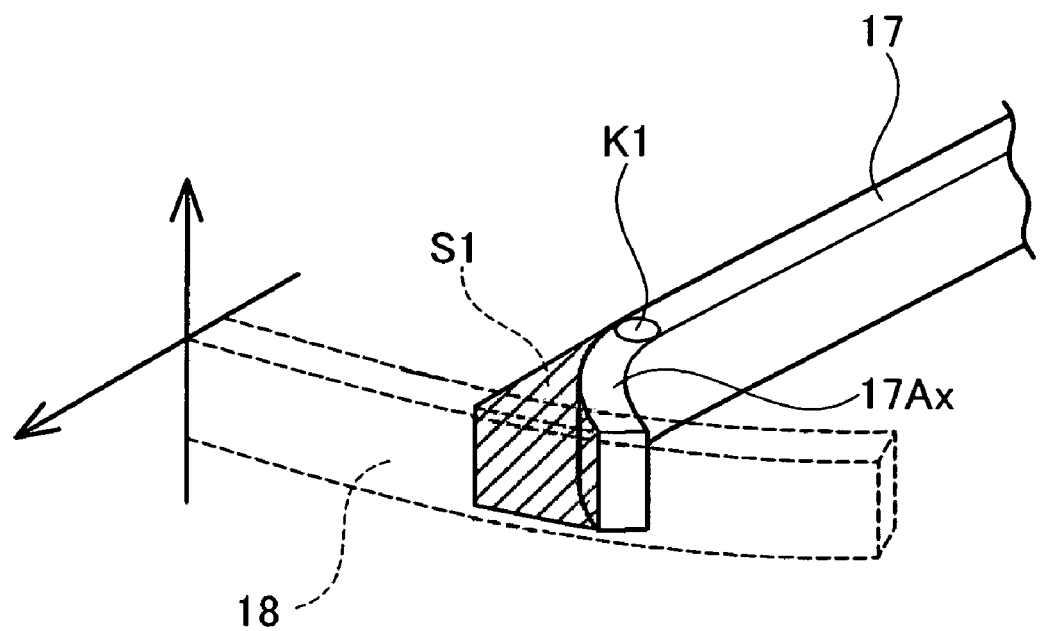
FIG. 35A is a simplified diagrammatic perspective view of the two dimensionally curved part of one end of the longitudinal frame member in only one of its curved dimensions and one end of the transverse frame member shown in FIG. 34.
Figure 35B:
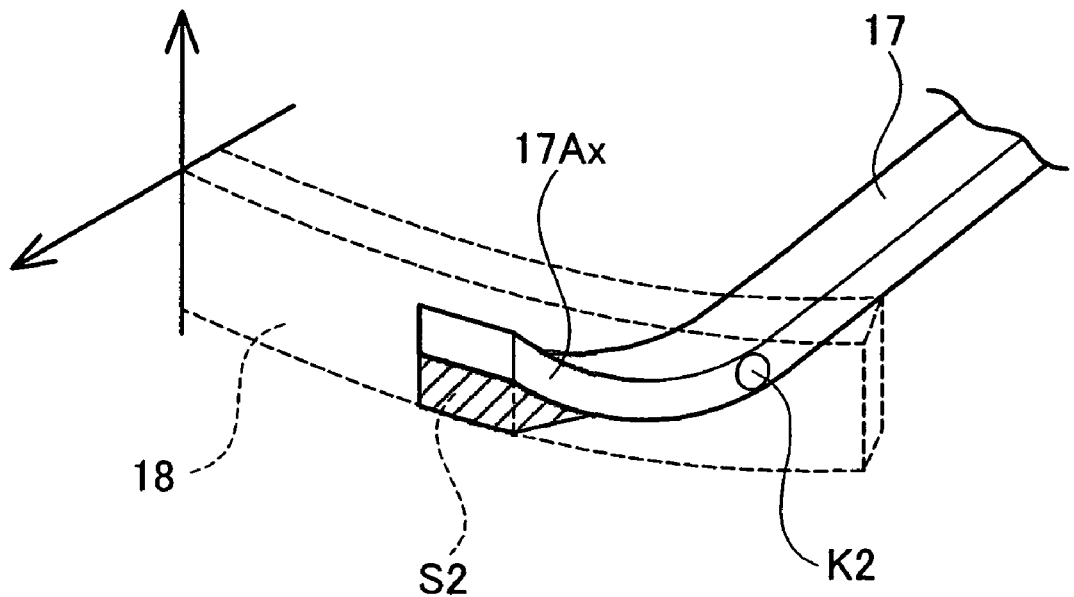
FIG. 35B is a simplified diagrammatic perspective view of the two dimensionally curved part of one end of the longitudinal frame member in other one of its curved dimensions and one end of the transverse frame member shown in FIG. 34.
Figure 36:
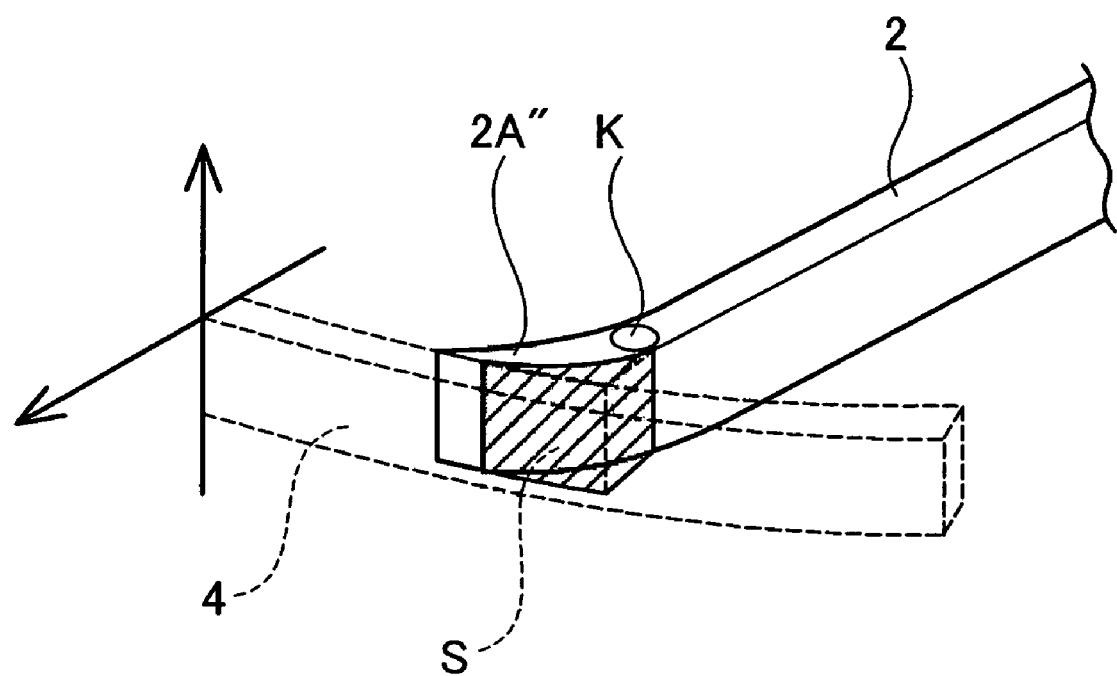
FIG. 36 is a perspective view of the curved part of one end of the longitudinal frame member and one end of the transverse frame member showing the details of the region F of FIG. 33.

FIG. 32 is a perspective view of the vehicle body frame structure of an automobile. FIG. 33 is a perspective view showing key features of the frame structure of the front portion of the vehicle body. FIG. 34 is a perspective view showing the details of the region E of FIG. 33. FIGS. 35A and 35B are perspective views showing the curved part 17Ax shown in FIG. 34 by illustrating the two different curvatures of the curved part 17Ax individually. FIG. 36 is a perspective view showing the details of the region F of FIG. 33.

As shown in FIGS. 32 and 33, the fifth embodiment illustrates a case in which a center cross member 4 and a lower cross member 18 are provided as transverse frame members. Similarly to the previous embodiments, the center cross member 4 is connected across the front ends of the front side members 2 and the lower cross member 18 is connected across the front ends of the side frames 17 of the sub frame 16. Similarly to the fourth embodiment, the curved parts 2A" of the front side members 2 are curved in different directions than the curved parts 17Ax of the side frames 17.

The main difference between the fifth embodiment and the fourth embodiment is that, as shown in FIG. 34, the curved parts 17Ax of the side frames 17 have a plurality of (two in this embodiment) curvature transition points K1 and K2 such that they curve in a multiple-dimensional manner.

More specifically, each of the curved parts 17Ax is curved transversely outward about a generally vertical axis at the curvature transition point K1 as shown in FIG. 35A and curved upward about a generally horizontal axis oriented in the transverse direction at the curvature transition point K2 as shown in FIG. 35A. Thus, the curved part 17Ax is curved both upward and outward due to these two curvature transition points K1 and K2.

Although only the left-hand curved part 17Ax shown in the region E of FIG. 33 is described here, the same constituent features are possessed by the right-hand curved part 17Ax. As a result of the curvature described above, a wedge-shaped open space S1 is formed between the curved part 17Ax and the lower cross member 18 on the transversely inward side of the curved part 17Ax as shown in FIG. 35A and another wedge-shaped open space S2 is underneath the curved part 17Ax as shown in FIG. 35B.

As shown in FIG. 36, the curved parts 2A" provided on the front ends of the side members 2 are curved transversely inward at curvature transition points K in substantially the same manner as the previous embodiments. Wedge-shaped open spaces S are formed between the curved parts 2A" and the center cross member 4 on the transversely outward sides of the curved parts 2A".

Since the curved parts 17Ax of the side frames 17 are curved both upward and outward, the collision contact surface area of a vehicle body end structure in accordance with the fifth embodiment increases in both the transverse direction and the vertical direction when the curved parts 17Ax deform due to a collision load imparted to the lower cross member 18. Consequently, the vehicle body end structure has a robust (strong) collision performance in the transverse direction when colliding with an object that strikes the vehicle diagonally from the front and also a robust collision performance in the vertical direction when, for example, colliding with a vehicle whose bumper or other energy absorbing member is positioned at a different height.

Additionally, the outward curvature of the two-dimensionally curved parts 17Ax of the side frames 17 works together with the inward curvature of the curved parts 2A" of the side members 2 to produce a large contact surface area oriented in the transverse direction when these curved parts 2A″ and 17Ax deform, thus further increasing the energy absorption efficiency of the vehicle body end structure with respect to diagonal front collisions.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to each of the Japanese Patent Application Nos. 2003-333641, 2003-383707 and 2004-149428. The entire disclosure of each of the Japanese Patent Application Nos. 2003-333641, 2003-383707 and 2004-149428 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body end structure comprising:
a pair of first longitudinal frame members configured and arranged to extend in a lengthwise direction on both widthwise sides of a vehicle, each of the first longitudinal frame members having an end portion with a curved part; and
a first transverse frame member having interior surfaces connected to the curved parts of the end portions of the first longitudinal frame members such that the first transverse frame member extends in the widthwise direction of the vehicle,
the curved parts being configured and arranged relative to the first transverse frame member such that a pair of wedge-shaped open spaces are formed between the interior surfaces of the first transverse frame member and corresponding wall surfaces of the curved parts that faces the interior surfaces of the first transverse frame member,
each of the curved parts being provided with a deformation control structure arranged and configured to prevent the occurrence of localized stress concentration and enable the curved parts to deform in a stable manner sequentially against the first transverse frame member when an end axial load is imparted to the vehicle body end structure.

2. The vehicle body end structure as recited in claim 1, wherein
the deformation control structures are formed by the curved parts having tubular polygonal cross sectional shapes with a plurality of lengthwise spaced notches disposed in surfaces of the curved parts that face toward a center of curvature of a respective one of the curved parts.

3. The vehicle body end structure as recited in claim 1, wherein
the deformation control structures are formed by the curved parts having tubular polygonal cross sectional shapes with a plurality of lengthwise spaced notches disposed in at least one vertex formed by a center of curvature facing surface in each of the curved parts that faces toward a center of curvature of the respective one of the curved parts.

4. The vehicle body end structure as recited in claim 3, wherein
the notches of the deformation control structures are also disposed in an additional vertex formed by the center of curvature facing surface in the respective one of the curved parts.

5. The vehicle body end structure as recited in claim 1, wherein
the deformation control structures are formed by the curved parts having tubular polygonal cross sectional shapes with a points of weakening disposed in a surface of each of the curved parts that faces toward a center of curvature of a respective one of the curved parts.

6. The vehicle body end structure as recited in claim 1, wherein
the deformation control structures are formed by the curved parts having tubular polygonal cross sectional shapes with a reinforcement structure formed on at least one non-center of curvature facing surface of each of the curved parts that does not face a center of curvature of the respective one of the curved parts such that the reinforcement structure is configured and arranged to increase the rigidity of the at least one non-center of curvature facing surface of each of the curved parts.

7. The vehicle body end structure as recited in claim 6, wherein
the reinforcement structures are formed by at least one ridge.

8. The vehicle body end structure as recited in claim 6, wherein
the reinforcement structures are formed on a majority of the non-center of curvature facing surfaces of the curved parts.

9. The vehicle body end structure as recited in claim 1, wherein
the deformation control structures are formed by the curved parts being constructed of a plurality of tubular lengthwise section members connected together in which the section members having different cross sectional sizes.

10. The vehicle body end structure as recited in claim 8, wherein
the tubular lengthwise section members are arranged to decrease in their cross sectional sizes as the tubular lengthwise section members are disposed further from a curvature transition point that is formed between each of the curved parts and a corresponding main longitudinal part of the first longitudinal frame members.

11. The vehicle body end structure recited in claim 1, wherein
the deformation control structures are formed by the curved parts having tubular cross sectional shapes with a varying wall thickness.

12. The vehicle body end structure recited in claim 1, wherein
each of the curved parts is formed as a separate entity from a main longitudinal part of the first longitudinal frame member and is connected to a front end of the main part of the first longitudinal frame member.

13. The vehicle body end structure recited in claim 1, wherein
each of the curved parts is configured and arranged to curve outwardly in the widthwise direction of the vehicle from a curvature transition point that is formed between each of the curved parts and a corresponding main longitudinal part of the first longitudinal frame members.

14. The vehicle body end structure recited in claim 1, wherein
each of the curved parts is configured and arranged to curve inwardly in the widthwise direction of the vehicle from a curvature transition point that is formed between each of the curved parts and a corresponding main longitudinal part of the first longitudinal frame members.

15. The vehicle body end structure recited in claim 1, wherein
each of the curved parts is configured and arranged to curve upwardly in the widthwise direction of the vehicle from a curvature transition point that is formed between each of the curved parts and a corresponding main longitudinal part of the first longitudinal frame members.

16. The vehicle body end structure recited in claim 1, wherein
each of the curved parts is configured and arranged to curve downwardly in the widthwise direction of the vehicle from a curvature transition point that is formed between each of the curved parts and a corresponding main longitudinal part of the first longitudinal frame members.

17. The vehicle body end structure recited in claim 1, wherein
each end part of the first transverse frame member is disposed outwardly of a curvature transition point that is formed between a correspond one of the curved parts and a corresponding main longitudinal part of the first longitudinal frame members.

18. The vehicle body end structure as recited in claim 1, wherein
the curved parts are curved in at least two different directions to define at least two different curvature transition points.

19. The vehicle body end structure recited in claim 1, further comprising
at least one pair of second longitudinal frame members disposed such that the first and second longitudinal frame members are vertically arranged relative to each other on each lateral vehicle side, each of the second longitudinal frame members having an end portion with a curved part; and
at least one second transverse frame member having interior surfaces connected to the curved parts of the second longitudinal frame members such that the second transverse frame member extends in the widthwise direction of the vehicle,
the curved parts of the second longitudinal frame members being configured and arranged relative to the second transverse frame member such that a pair of wedge-shaped open spaces are formed between the interior surfaces of the second transverse frame member and corresponding wall surfaces of the curved parts of the second longitudinal frame members that faces the interior surfaces of the second transverse frame member,
each of the curved parts of the second longitudinal frame members being provided with a deformation control structure arranged and configured to prevent the occurrence of localized stress concentration and enable the curved parts of the second longitudinal frame members to deform in a stable manner when an end axial load is imparted to the vehicle body end structure.

20. The vehicle body end structure as recited in claim 19, wherein
the curved parts of the first longitudinal frame members curve in different directions than the curved parts of the second longitudinal frame members.

21. The vehicle body end structure as recited in claim 19, wherein
the curved parts of the first and second longitudinal frame members on corresponding lateral sides of the vehicle being provided with curvatures oriented in the same direction.

22. The vehicle body end structure as recited in claim 19, wherein
the curved parts of the second longitudinal frame members are curved in at least two different directions to define at least two different curvature transition points.

23. The vehicle body end structure recited in claim 22, wherein
each of the curved parts of the first longitudinal frame members is configured and arranged to curve in the widthwise direction of the vehicle from a curvature transition point that is formed between each of the curved parts of the first longitudinal frame members and a corresponding main longitudinal part of the first longitudinal frame members.

24. The vehicle body end structure recited in claim 19, wherein
each of the curved parts of the first longitudinal frame members is configured and arranged to curve in the widthwise direction of the vehicle from a curvature transition point that is formed between each of the curved parts of the first longitudinal frame members and a corresponding main longitudinal part of the first longitudinal frame members.

25. The vehicle body end structure recited in claim 24, wherein
the curvatures of the curved parts of the second longitudinal frame members are curved upwardly from a curvature transition point that is formed between each of the curved parts of the second longitudinal frame members and a corresponding main longitudinal part of the second longitudinal frame members.

26. The vehicle body end structure recited in claim 25, further comprising
at least one pair of third longitudinal frame members disposed such that the first, second and third longitudinal frame members are vertically arranged relative to each other on each lateral vehicle side, each of the third longitudinal frame members having an end portion with a curved part; and
at least one third transverse frame member having interior surfaces connected to the curved parts of the third longitudinal frame members such that the third transverse frame member extends in the widthwise direction of the vehicle, the curved parts of the third longitudinal frame members being configured and arranged relative to the third transverse frame member such that a pair of wedge-shaped open spaces are formed between the interior surfaces of the third transverse frame member and corresponding wall surfaces of the curved parts of the third longitudinal frame members that faces the interior surfaces of the third transverse frame member, each of the curved parts of the third longitudinal frame members being provided with a deformation control structure arranged and configured to prevent the occurrence of localized stress concentration and enable the curved parts of the third longitudinal frame members to deform in a stable manner when an end axial load is imparted to the vehicle body end structure.

27. The vehicle body end structure recited in claim 26, wherein
the curved parts of the third longitudinal frame members curve in different directions than the curved parts of the first and second longitudinal frame members.

28. The vehicle body end structure recited in claim 27, wherein
the curvatures of the curved parts of the third longitudinal frame members are curved downwardly from a curvature transition point that is formed between each of the curved parts of the third longitudinal frame members and a corresponding main longitudinal part of the third longitudinal frame members.

29. The vehicle body end structure as recited in claim 19, wherein
the deformation control structures are formed by the curved parts having tubular polygonal cross sectional shapes with a points of weakening disposed in a surface of each of the curved parts that faces toward a center of curvature of a respective one of the curved parts.

30. The vehicle body end structure as recited in claim 19, wherein
the deformation control structures are formed by the curved parts having tubular polygonal cross sectional shapes with a reinforcement structure formed on at least one non-center of curvature facing surface of each of the curved parts that does not face a center of curvature of the respective one of the curved parts such that the reinforcement structure is configured and arranged to increase the rigidity of the at least one non-center of curvature facing surface of each of the curved parts.

31. A vehicle body end structure comprising:
longitudinal frame means for providing lengthwise support on both widthwise sides of an end section a vehicle, the longitudinal frame means having an end portion with a curved part disposed forwardly of a curvature transition point; and widthwise frame means for providing widthwise support between the end portions of the longitudinal frame means to create a pair of wedge-shaped open spaces between interior facing surfaces of the widthwise frame means and corresponding wall surfaces of the curved parts that faces the interior facing surfaces of the widthwise frame members, each of the curved parts being provided with deformation control means for limiting the occurrence of localized stress concentration and enable the curved parts to deform in a stable manner sequentially against the width wise frame means when an end axial load is imparted to the vehicle body end structure.

32. A vehicle body end structure comprising:
a pair of first longitudinal frame members configured and arranged to extend in a lengthwise direction on both widthwise sides of a vehicle, each of the first longitudinal frame members having an end portion with a collapsing part; and a first transverse frame member having interior surfaces connected to the collapsing parts of the end portions of the first longitudinal frame members such that the first transverse frame member extends in the widthwise direction of the vehicle, the collapsing parts being configured and arranged relative to the first transverse frame member such that a pair of wedge-shaped open spaces are formed between the interior surfaces of the first transverse frame member and corresponding wall surfaces of the collapsing parts that faces the interior surfaces of the first transverse frame member, each of the collapsing parts being provided with a deformation control structure arranged and configured to enable the collapsing parts to deform in a stable manner such that contacting areas between the interior surfaces of the first transverse frame member and the corresponding wall surfaces of the collapsing parts increase as the collapsing parts deform when an end axial load is imparted to the vehicle body end structure.

* * * * *